United States Patent
Mizuuchi et al.

(10) Patent No.: US 6,631,231 B2
(45) Date of Patent: Oct. 7, 2003

(54) OPTICAL WAVEGUIDE ELEMENTS, OPTICAL WAVELENGTH CONVERSION ELEMENTS, AND PROCESS FOR PRODUCING OPTICAL WAVEGUIDE ELEMENTS

(75) Inventors: Kiminori Mizuuchi, Neyagawa (JP); Kazuhisa Yamamoto, Takatsuki (JP); Tatsuo Kawaguchi, Motosu-gun (JP); Takashi Yoshino, Ama-gun (JP); Minoru Imaeda, Nagoya (JP); Kenji Aoki, Ogaki (JP); Osamu Mitomi, Nagoya (JP)

(73) Assignees: Matsushita Electric Industrial Co., Ltd., Kadoma (JP); NGK Insulators, Ltd., Nagoya (JP)

( * ) Notice: Subject to any disclaimer, the term of this patent is extended or adjusted under 35 U.S.C. 154(b) by 34 days.

(21) Appl. No.: 09/810,516

(22) Filed: Mar. 16, 2001

(65) Prior Publication Data

US 2001/0055453 A1 Dec. 27, 2001

(30) Foreign Application Priority Data

| Mar. 21, 2000 | (JP) | ......... 2000-077630 |
| Sep. 4, 2000 | (JP) | ......... 2000-266564 |
| Dec. 18, 2000 | (JP) | ......... 2000-383287 |

(51) Int. Cl.$^7$ .................. G02B 6/00
(52) U.S. Cl. .................. 385/122; 385/130
(58) Field of Search .................. 385/122, 130, 385/147

(56) References Cited

U.S. PATENT DOCUMENTS

| 4,420,873 A | * | 12/1983 | Leonberger et al. | ......... 117/918 |
| 5,150,447 A | * | 9/1992 | Tamada et al. | ......... 117/66 |
| 5,303,247 A | * | 4/1994 | Yamamoto et al. | ......... 359/328 |
| 5,313,543 A | * | 5/1994 | Matsuda et al. | ......... 359/328 |
| 5,504,616 A | * | 4/1996 | Shinozaki et al. | ......... 359/326 |
| 5,872,884 A | * | 2/1999 | Mizuuchi et al. | ......... 359/332 |
| 5,943,465 A | * | 8/1999 | Kawaguchi et al. | ......... 117/73 |
| 6,353,495 B1 | * | 3/2002 | Mizuuchi et al. | ......... 359/326 |

FOREIGN PATENT DOCUMENTS

JP    07-225403    8/1995

OTHER PUBLICATIONS

Kazuo EDA, Yoshihiro Tomita, Masato Sugimoto, Tetsuyoshi Ogura, Akihiko Nanba, Masaru Ikeda, Yutaka Yaguchi, Tetsuyuki Okano, "Direct Bonding of Piezoelectric Materials," Technical Report of IEICE, US95-24, EMD95-20, CPM95-32(Jul. 1995), pp 31–38.

Mizuuchi, K., Yamamoto, K., Kato, M., "Harmonic blue light generation in X–cut MgO:LiNbO$_3$ waveguide," Electronics Letters, Apr. 24, 1997, vol. 33, No. 9, pp 806–807.

* cited by examiner

Primary Examiner—Tulsidas Patel
(74) Attorney, Agent, or Firm—Burr & Brown

(57) ABSTRACT

An optical waveguide element includes a three-dimensional optical waveguide of a bulky non-linear optical crystal, a substrate, and a joining layer made of an amorphous material. The substrate is joined to the optical waveguide via the joining layer.

45 Claims, 20 Drawing Sheets

Relationsship between Δn and single mode depth

OPTICAL WAVEGUIDE ELEMENTS, OPTICAL WAVELENGTH CONVERSION ELEMENTS, AND PROCESS FOR PRODUCING OPTICAL WAVEGUIDE ELEMENTS

BACKGROUND OF THE INVENTION

(1) Field of the Invention

The present invention relates to an optical waveguide element suitable for a second harmonic generation device of a quasi phase-matching type and a process for producing the same.

(2) Related Art Statement

In the general optical information processing technology, the blue light laser that stably generates blue light around in a wavelength range of 400 to 430 nm at an output of not less than 30 mW has been demanded to realize high density optical recording, and competitions have occurred in developments. As the blue light source, an optical waveguide type frequency conversion device in which a laser generating an infrared as fundamental waves is combined with a quasi phase-matching type second harmonic generation element has been expected.

In the second harmonic generation device using a single crystal of lithium niobate, there is a limitation upon increase in the output of the light, because increase in the output of the light propagating the crystal changes the refractive index in the crystal through optical damage. The shorter the wavelength of the light, the more conspicuous is the optical damage. It is known that when a substrate of lithium niobate in which MgO is incorporated is used, it exhibits more resistance against the optical damage. At that time, the addition amount of MgO is around 5 mol %.

According to "Electronics Letters, 24th April, 1997, Vol. 33, No. 9, pp 806 to 807, a optical waveguide type second harmonic generation device is realized by forming a periodically polarization-inverted structure at a substrate of MgO-doped lithium niobate, and forming a proton-exchanged optical waveguide in a direction orthogonal to this structure.

However, if the generated output of the blue light increases in the second harmonic generation device of this type, a stable output could not be obtained due to the optical damage. For example, when a periodically polarization-inverting structure is formed at lithium niobate doped with 5 mol % of MgO, a proton-exchanged optical waveguide is formed in a direction orthogonal to this structure, and a blue light having a wavelength of 420 nm is generated, the emitted beam and output largely vary due to the optical damage when the output is not less than 10 mW, particularly not less than around 15 mW. A cause for such variations in the emitted beam and the output was unclear.

SUMMARY OF THE INVENTION

It is an object of the present invention to reduce variations in output and realize stable resonance in an optical waveguide type device, even if the output of the emitted beam form the optical waveguide is increased.

It is another object of the present invention, in a frequency conversion element using a quasi phase-matching system, to shorten the wavelength of emitted light, preferably emit light in a blue range, and effect stable resonance with less variation even if the output in the emitted light through the optical waveguide is increased.

A first aspect of the present invention is to provide an optical waveguide element comprising a three-dimensional optical waveguide of a bulky non-linear optical crystal, a substrate, and a joining layer made of an amorphous material through which the substrate is joined to the optical waveguide.

A second aspect of the present invention is to provide an optical waveguide element comprising a three-dimensional optical waveguide of a bulky non-linear optical crystal, and an underclad for the optical waveguide, wherein the three-dimensional waveguide is formed in such a thickness by mechanically working the non-linear optical crystal as permitting light to be confined, and the underclad comprises an amorphous material.

A third aspect of the present invention is to provide a process for producing an optical waveguide element, comprising the steps of joining an optical waveguide-forming material of a bulky non-linear optical crystal to a separate substrate via a joining layer of an amorphous material, and forming a three-dimensional optical waveguide by working the optical waveguide-forming material, wherein the joining layer has a refractive index smaller than that of the non-linear optical crystal.

A fourth aspect of the present invention is to provide a process for producing an optical waveguide element, comprising the steps of joining an optical waveguide-forming material of a bulky non-linear optical crystal to a separate substrate via a joining layer of an amorphous material, and forming a three-dimensional optical waveguide by working the optical waveguide-forming material, wherein the joining layer has a refractive index smaller than that of the non-linear optical crystal.

A fourth aspect of the present invention is to provide an optical wave-length conversion element comprising a three-dimensional optical waveguide of a slab-shaped non-linear optical crystal, and clad layers of an amorphous material on upper and lower surfaces of the optical waveguide.

The present inventors discovered that when the three dimensional optical waveguide of the bulky non-linear optical crystal is joined to the substrate via the joining layer or directly to the substrate with no joining layer, and the joining layer or the substrate which is a base for the optical waveguide is used as an underclad, the optical damage is conspicuously suppressed and variations in the output of the light is prevented, if the light propagating in the optical waveguide is increased and/or the wavelength is shortened. As a result, the inventors reached the present invention.

BRIEF DESCRIPTION OF THE INVENTION

For a better understanding of the invention, reference is made to the attached drawings, wherein:

FIG. 1(a) is a sectional view of schematically illustrating one embodiment of the optical waveguide element 1A according to the present invention in which a ridge type three-dimensional optical waveguide 4 and a periodically polarization-inverted structure 5 are formed, and FIG. 1(b) being a perspective view of schematically illustrating the element in FIG. 1(a);

FIGS. 2(a) and 2(b) are sectional views of schematically illustrating a process for producing the optical waveguide element in FIGS. 1(a) and 1(b):

Figure 7:
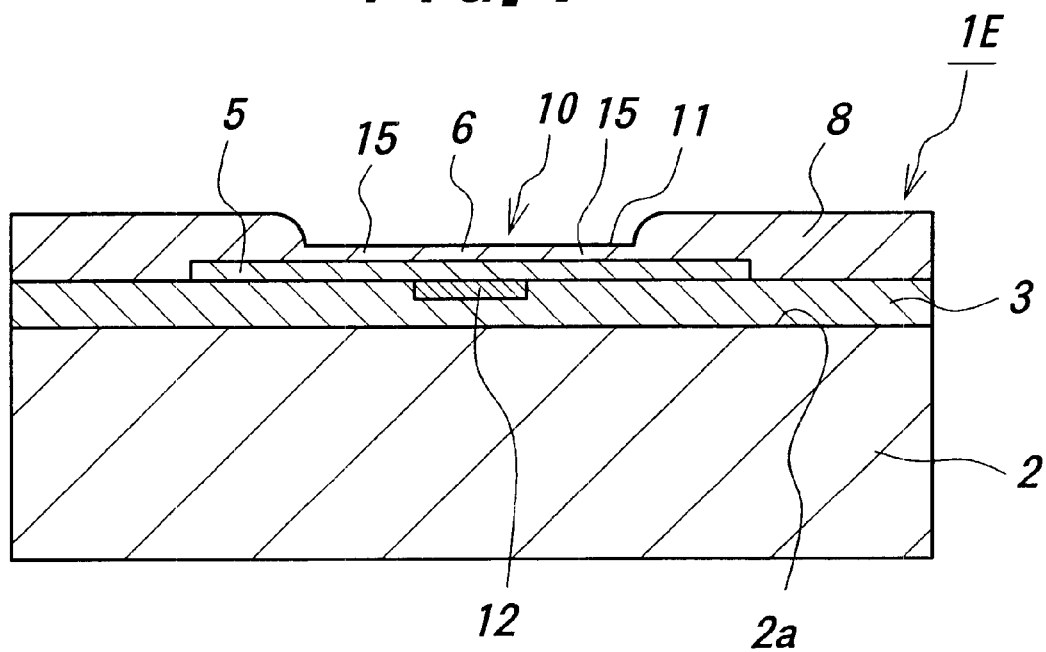
FIG. 7 is a sectional view of schematically illustrating a still further embodiment of the optical waveguide element 1E according to the present invention in which an optical waveguide 10 of a dielectric-coated type is formed.
Figure 8A:
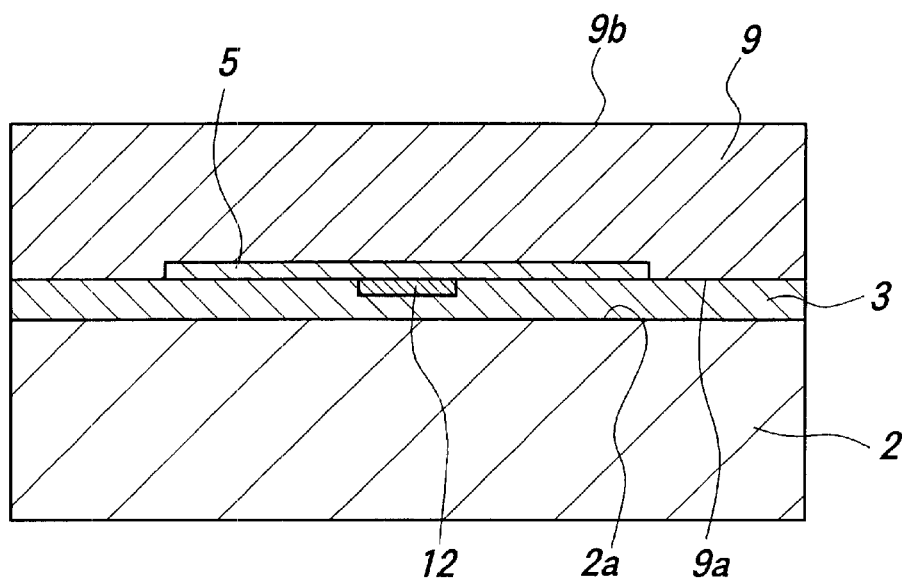
Figure 8B:
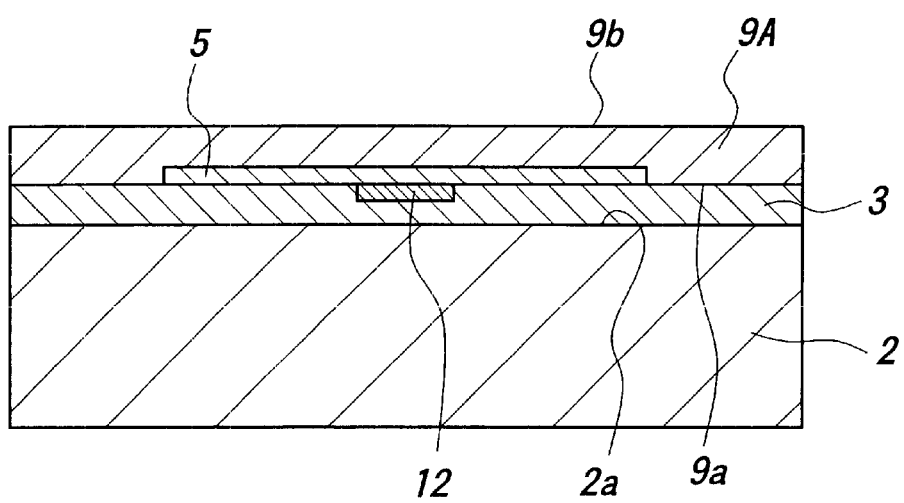
Figure 9:
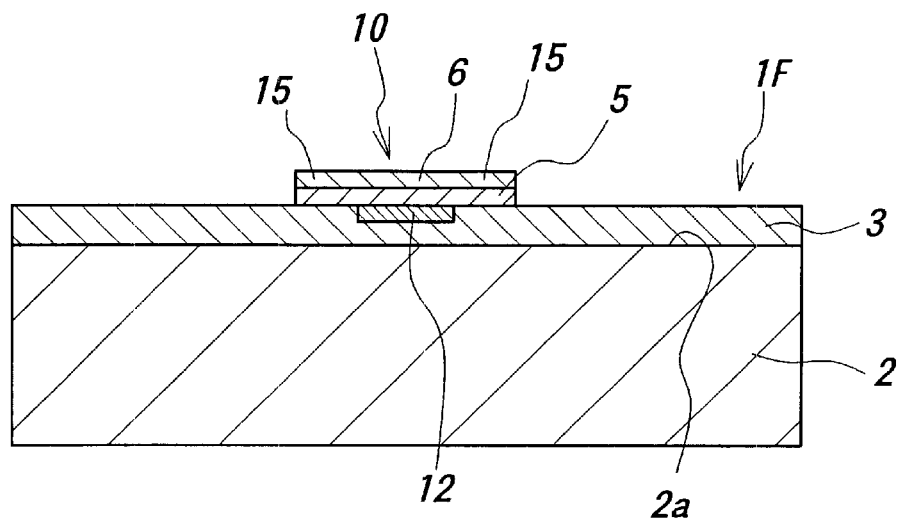
Figure 10:
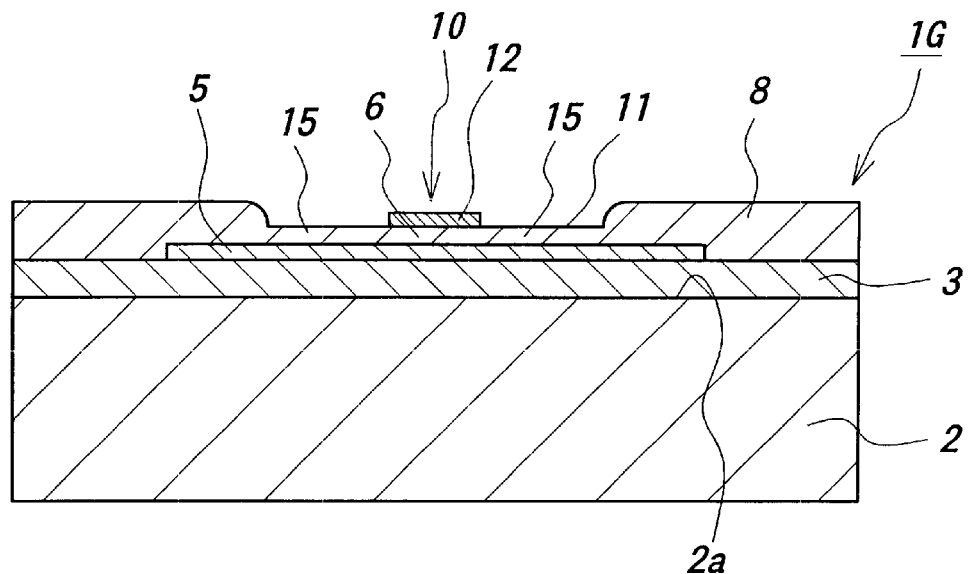
Figure 11:
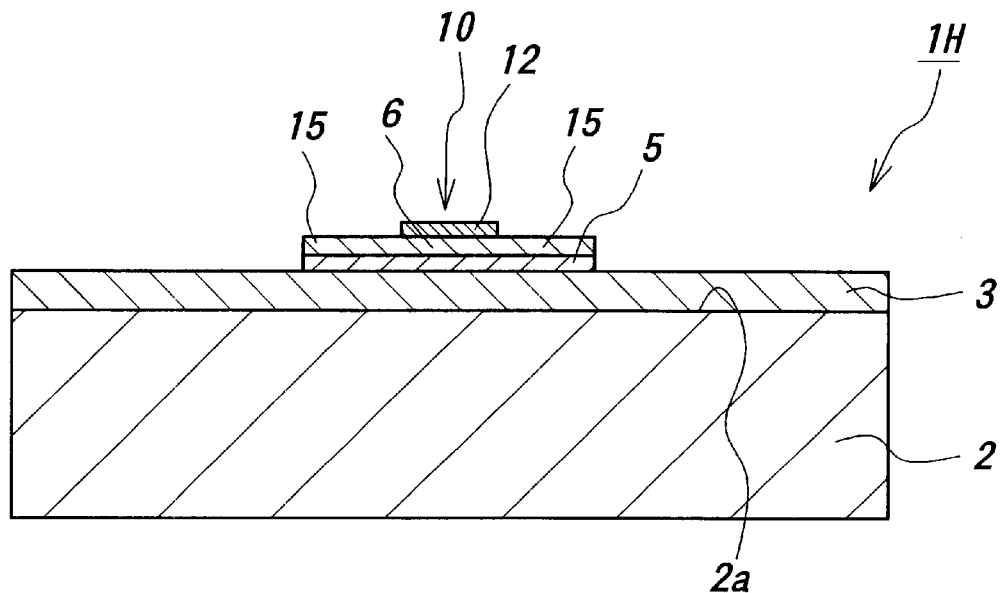
Figure 12:
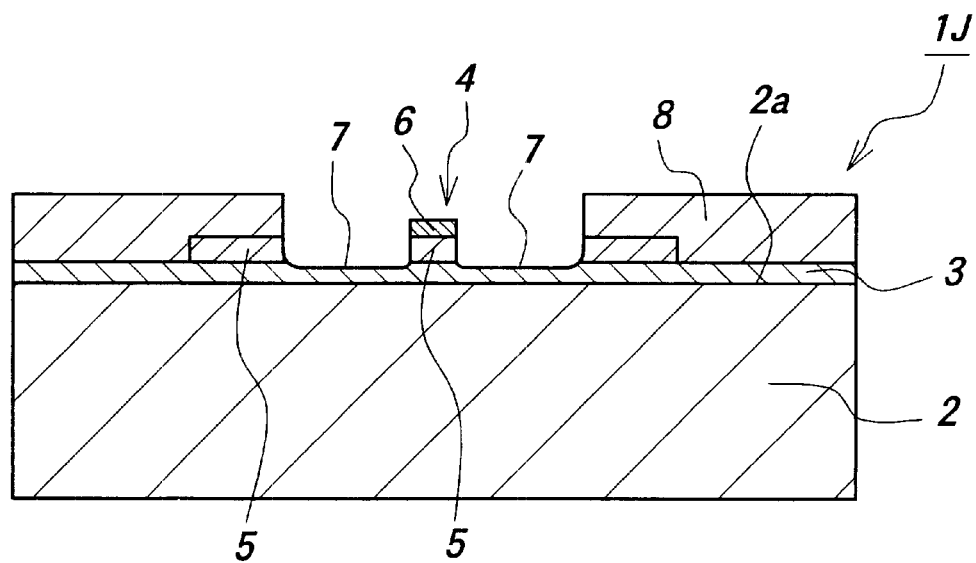
Figure 13:
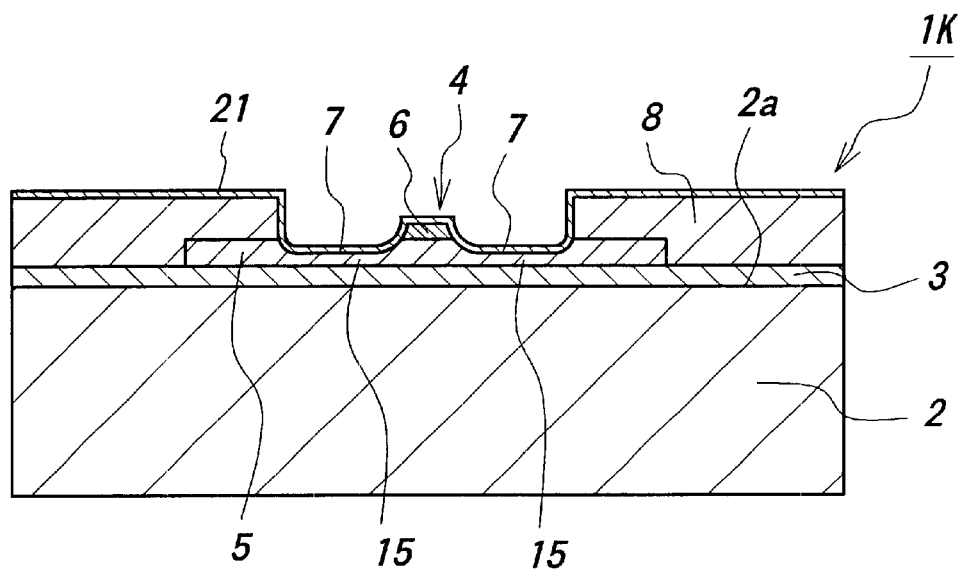
Figure 14:
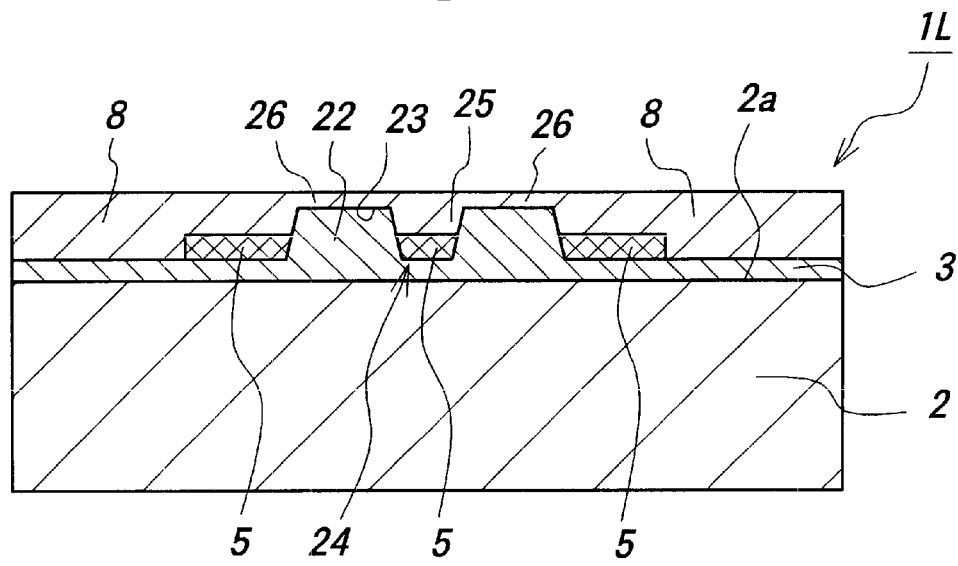
Figure 15A:
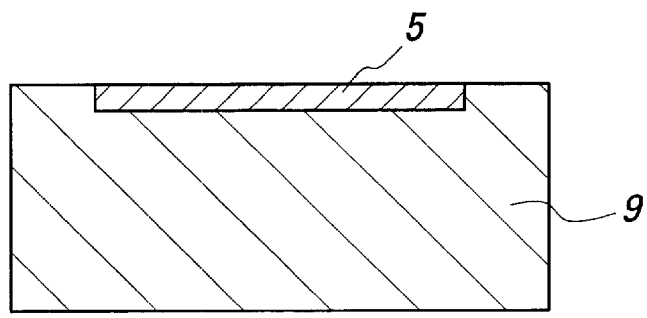
Figure 15B:
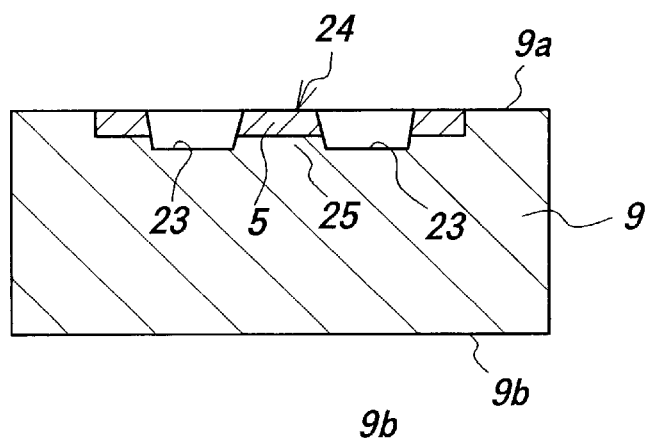
Figure 15C:
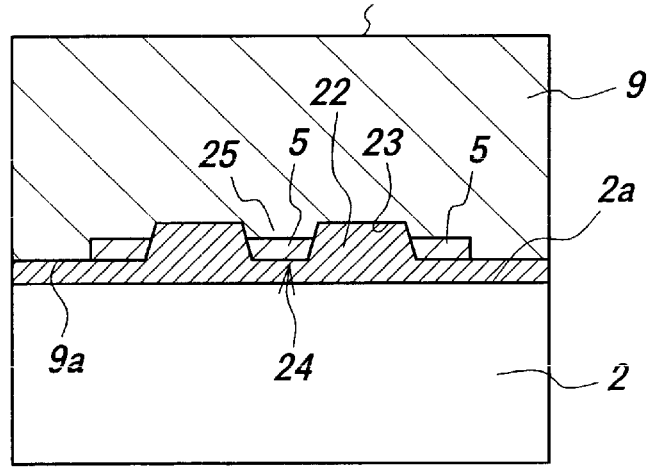
Figure 16:
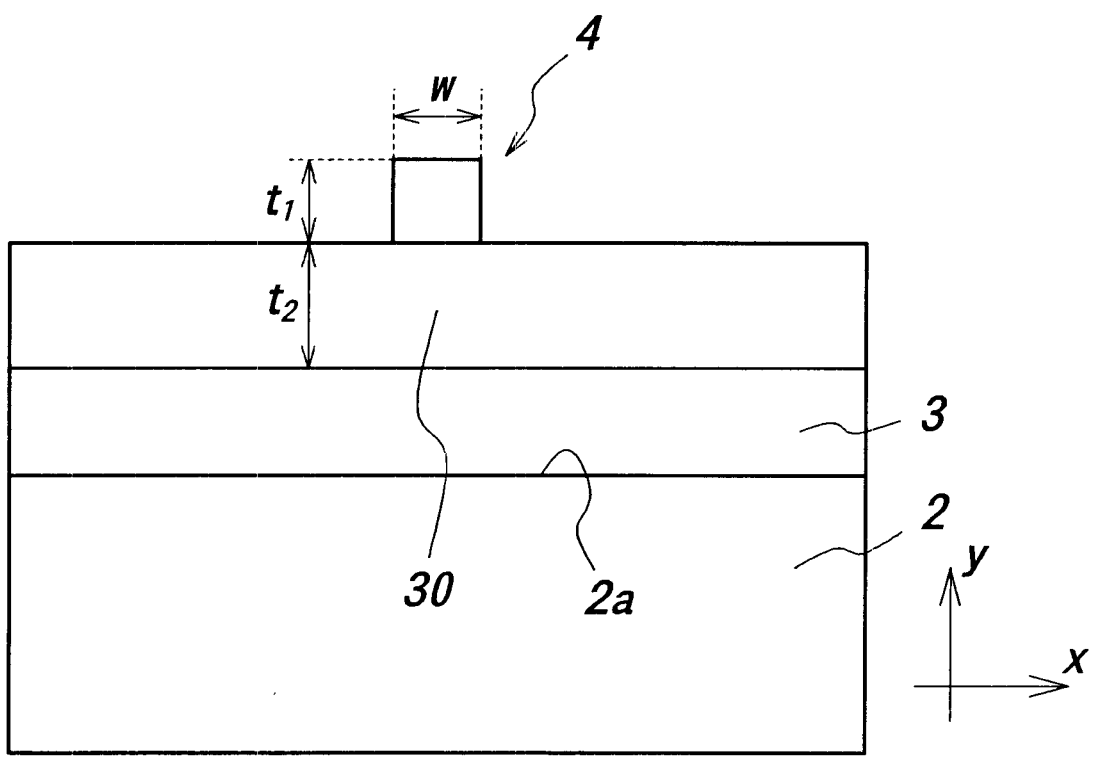
Figure 17:
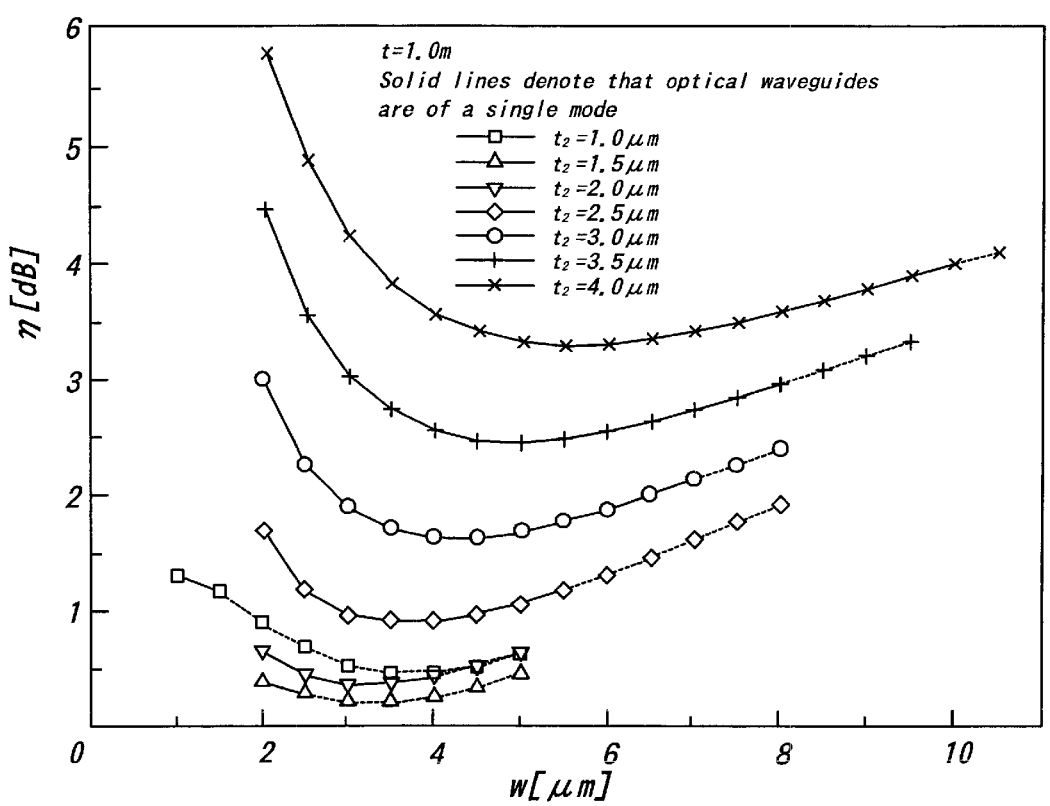
Figure 18:
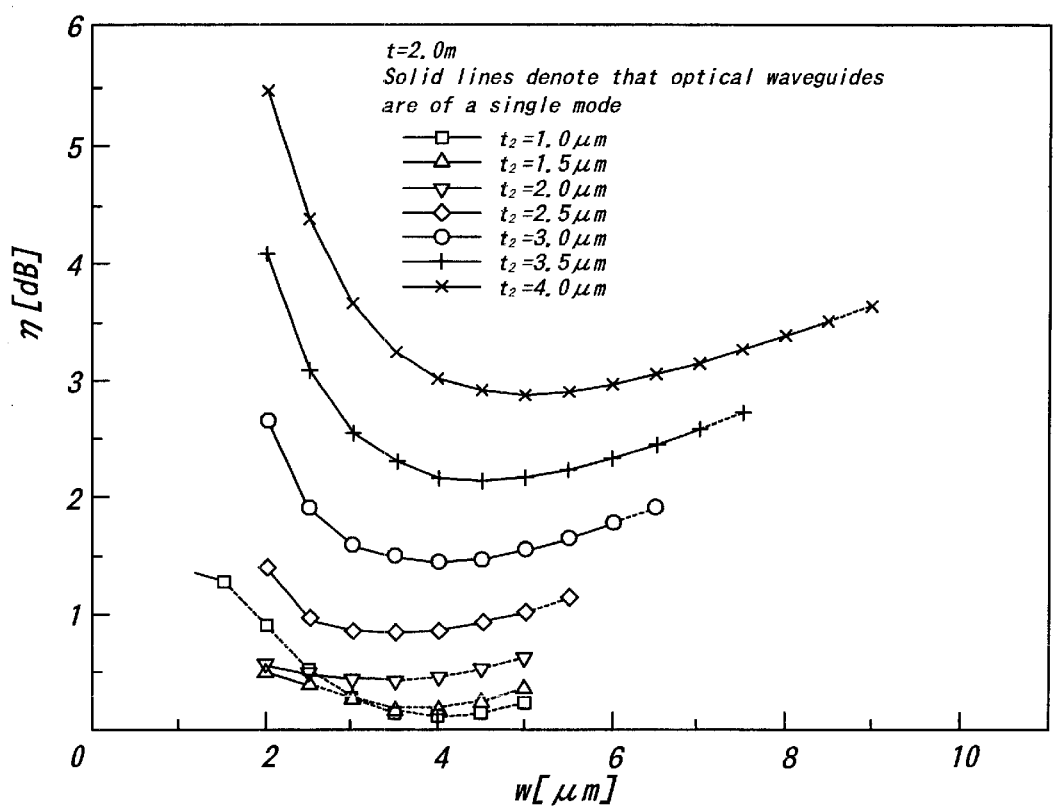
Figure 19:
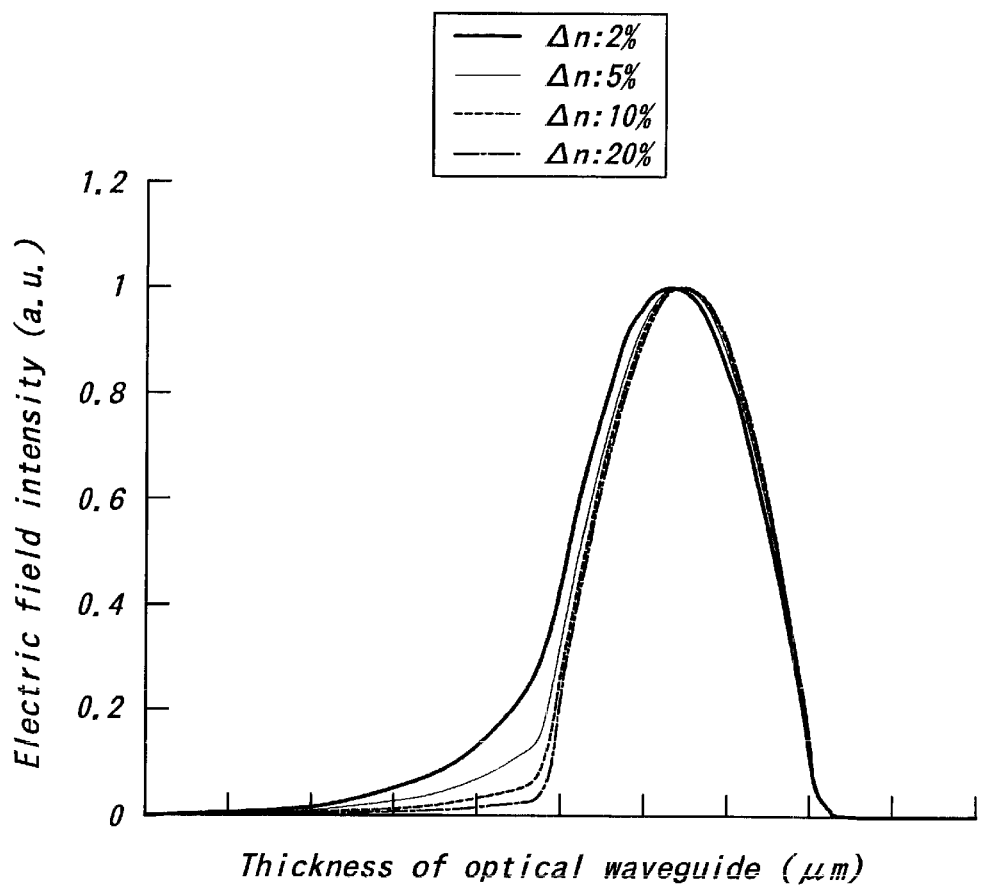
Figure 20:
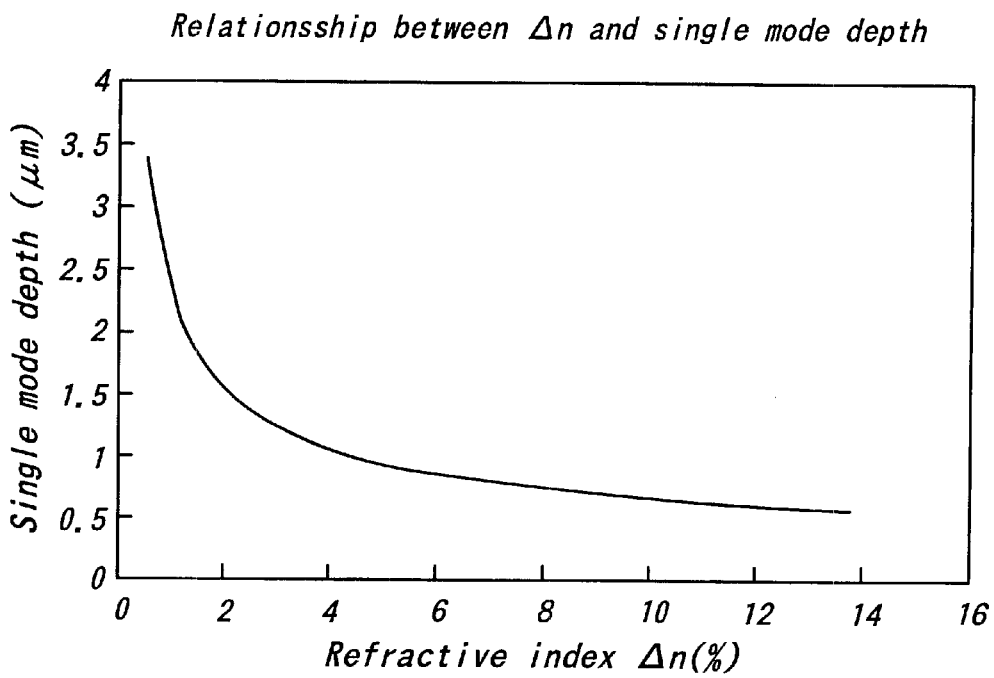
Figure 21:
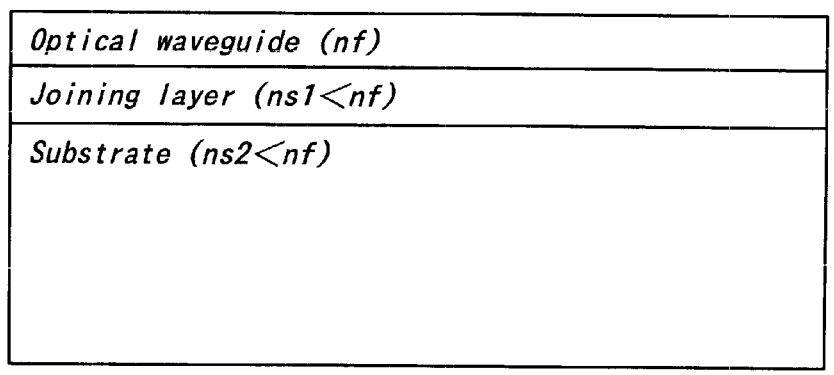
Figure 22:
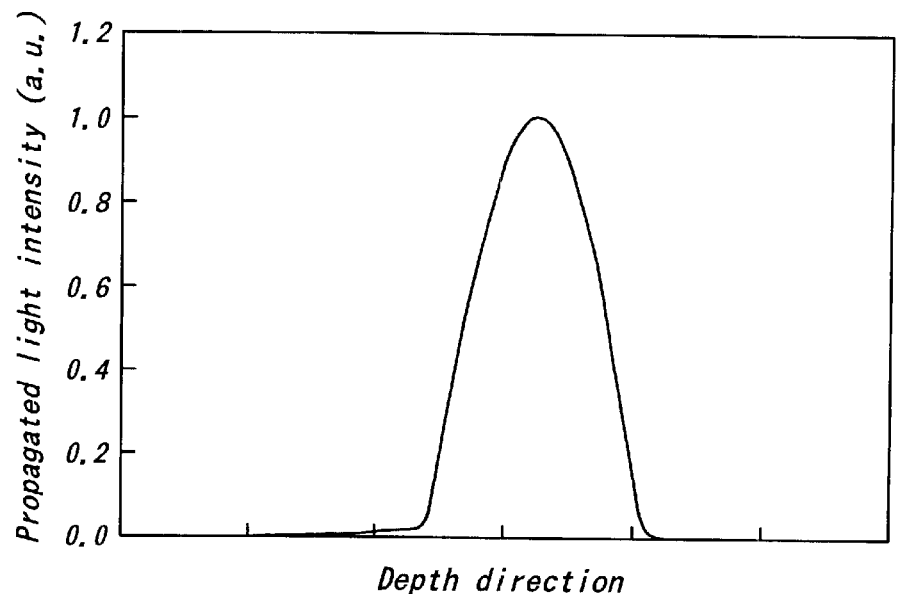
Figure 23:
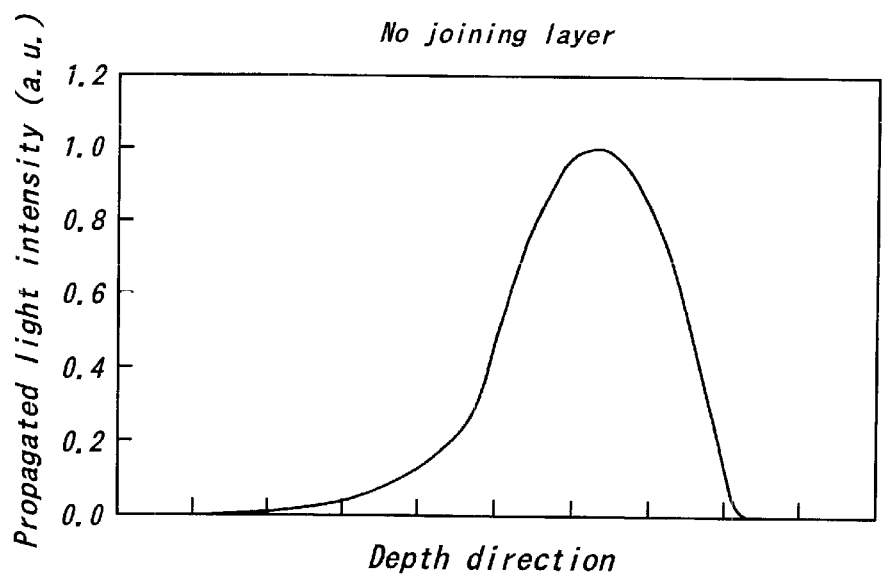
Figure 24:
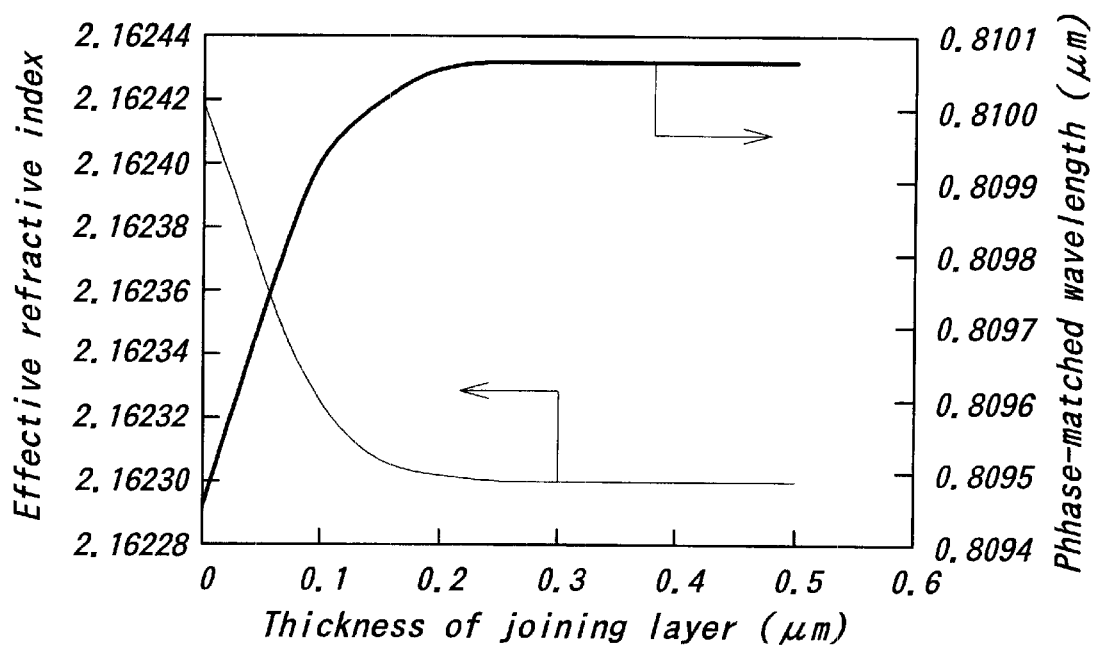
Figure 25:
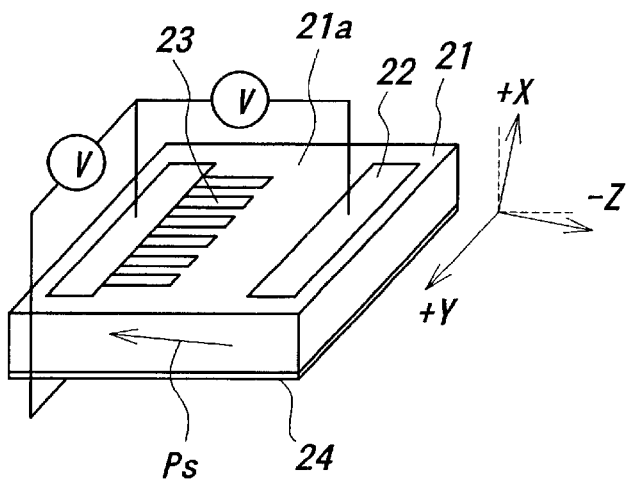
Figure 26:
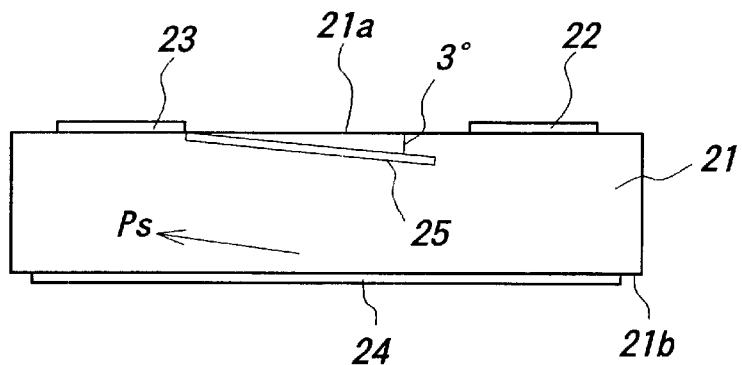
Figure 27:
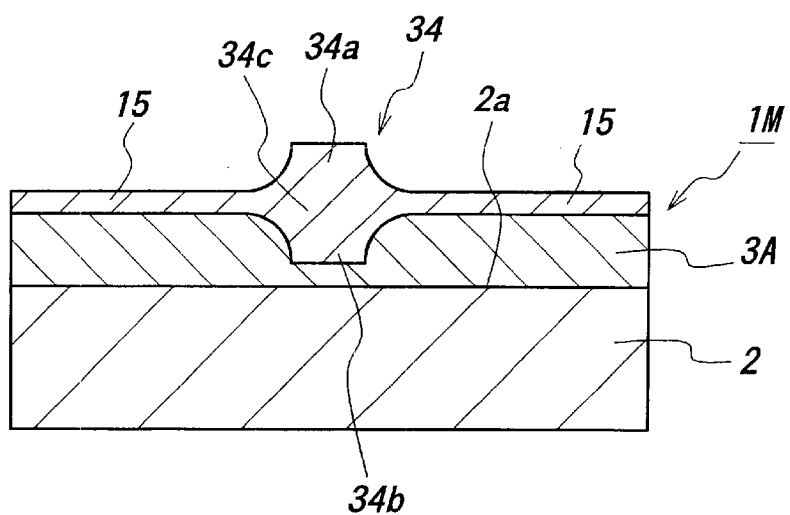
Figure 28:
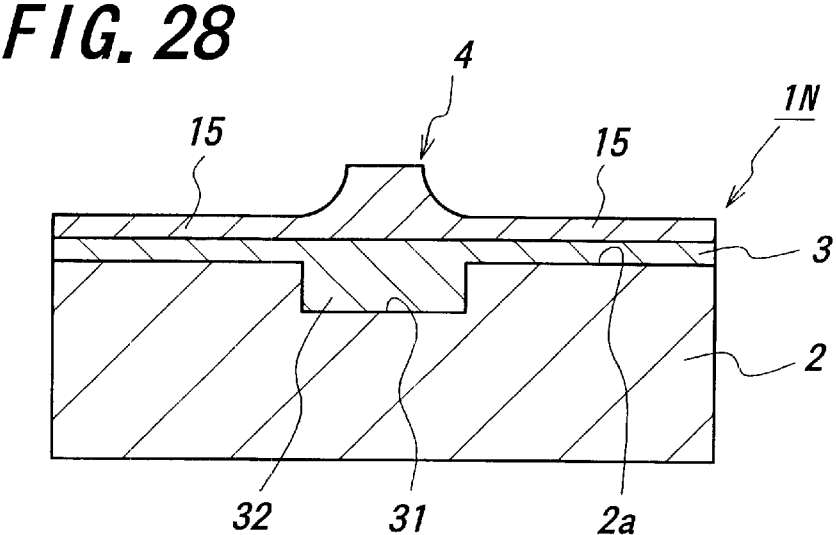
Figure 29:
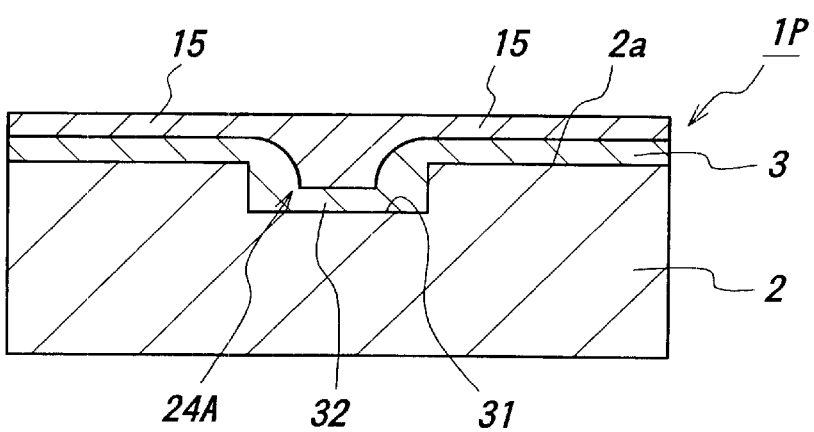
Figure 30:
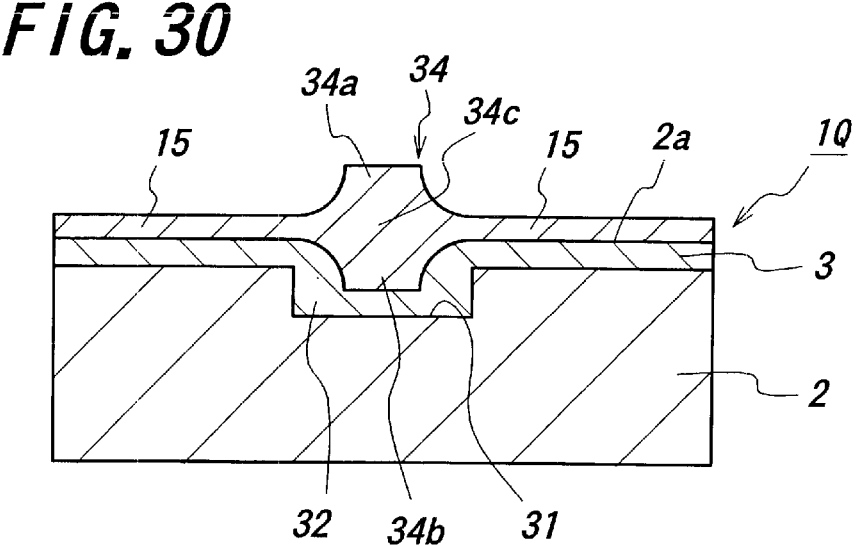
Figure 31:
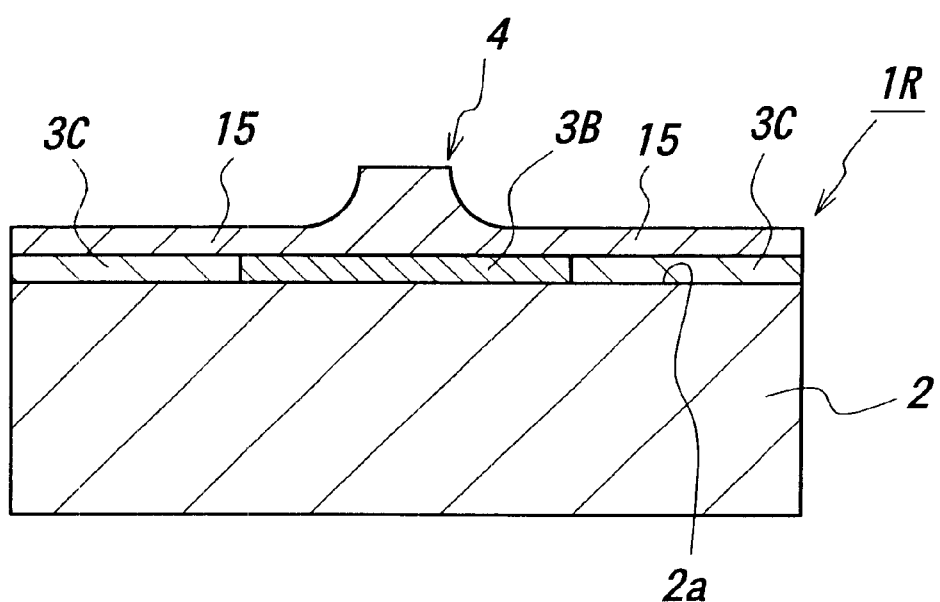

FIGS. 8(a) and 8(b) are sectional view of schematically illustrating a process for producing the optical waveguide element in FIG. 7;

FIG. 9 is a sectional view of schematically illustrating a still further embodiment of the optical waveguide element 1F according to the present invention in which thick portions are removed from the optical waveguide element of FIG. 7;

FIG. 10 is a sectional view of schematically illustrating a still further embodiment of the optical waveguide element 1G according to the present invention in which a dielectric 12 is coated onto an optical waveguide 10;

FIG. 11 is a sectional view of schematically illustrating a still further embodiment of the optical waveguide element 1H according to the present invention in which thick portions are removed from the element of FIG. 10;

FIG. 12 is a sectional view of schematically illustrating a still further embodiment of the optical waveguide element 1J according to the present invention in which grooves 7 are formed into a joining layer 3, with extended portions being removed;

FIG. 13 is a sectional view of schematically illustrating a still further embodiment of the optical waveguide element 1E according to the present invention in which an overcoat layer 21 is formed over the entire surface of the element to cover an optical waveguide;

FIG. 14 is a sectional view of schematically illustrating a still further embodiment of the optical waveguide element 1L according to the present invention which comprises a pair of extended portions 26, and a ridge type optical waveguide 24 projecting from the extended portions 26 to a joining layer 3;

FIGS. 15(a), 15(b) and 15(c) are sectional views of showing the steps of producing the element in FIG. 14;

FIG. 16 is a model for calculating a single mode propagating condition for a fundamental wave (pumping light) and a harmonic wave when a pair of extended portions are formed at opposite sides of a ridge type optical waveguide;

FIG. 17 is a graph showing the single mode condition for the optical waveguide when the width w of the ridge portion 4 and the thickness t2 of the extended portion 15 are varied, while the height t1 of the ridge portion 4 is 1.0 μm;

FIG. 18 is a graph showing the single mode condition for the optical waveguide when the width w of the ridge portion 4 and the thickness t2 of the extended portion 15 are varied, while the height t1 of the ridge portion 4 is 2.0 μm;

FIG. 19 is a graph showing the relationship between the difference in refractive index between the optical waveguide and the joining layer and the electric field distribution;

FIG. 20 is a graph showing the relationship between a difference dn in refractive index between the optical waveguide and the joining layer and the maximum thickness satisfying the single mode condition when MgO-doped LiNbO$_3$ is used for the optical waveguide;

FIG. 21 is a schematic view showing the relationship in refractive index of layers in a three-layered structure of an optical waveguidek, a joining layer (refractive index of the joining layer<refractive index of a substrate), and the substrate;

FIG. 22 is a graph showing the relationship between the intensity of the propagated light and the depth when a joining layer is provided;

FIG. 23 is a graph showing the relationship between the intensity of the propagated light and the depth when no joining layer is provided;

FIG. 24 is a graph showing the relationship among the thickness of the joining layer, the phase-matched wavelength and the effective refractive index;

FIG. 25 is a perspective view of illustrating a state in which a voltage-applying method is used for an offcut substrate;

FIG. 26 is a schematic view of illustrating directions of polarization-inverted pattern in an offcut substrate;

FIG. 27 is a still another embodiment 1M of the element according to the present invention in which a three-dimensional optical waveguide 34 is provided with a pair of projections 34a and 34b;

FIG. 28 is a still another embodiment 1N of the element according to the present invention in which a recess 31 is formed at a side of a front surface 2a of a substrate 2;

FIG. 29 is a still another embodiment 1P of the element according to the present invention in which a recess 31 is formed at a side of a front surface 2a of a substrate 2, and a part of an optical waveguide 24A is inserted into the recess 31;

FIG. 30 is a still another embodiment 1Q of the element according to the present invention in which a recess 31 is formed at a side of a front surface 2a of a substrate 2, a part of a three-dimensional optical waveguide 34 is provided with a pair of projections 34a and 34b, and the projection 34b is inserted into the recess 31; and FIG. 31 is a still another embodiment 1R of the element according to the present invention which uses two kinds of joining layers 3B and 3C.

DETAILED DESCRIPTION OF THE INVENTION

The present invention will be explained in more detail with reference to the drawings.

FIG. 1 shows an optical waveguide element 1A in which an optical waveguide 4 is joined to a surface 2a of a substrate 2 via a joining layer 3. The optical waveguide 4 is of a ridge type, and planar extended portions 15 extend at both sides of the optical waveguide 4 in traversing directions, respectively. In this embodiment, a thick portion 8 is formed at an terminal of each of the extended portions 15 outsides a groove. A space or the recess 7 is defined above each extended portion 15 for the formation of the ridge type optical waveguide. A reference numeral 5 denotes a periodically polarization-inverted portion. In this embodiment, a polarity polarization non-inverted portion 6 exists in an upper portion of the optical waveguide, but this may be removed. Thus, the ridge type optical waveguide 4 is as if it floats above the separate substrate via the joining layer 3. No such a three-dimensional optical waveguide has been never seen in the state of the art. The term "three-dimensional optical waveguide" means an optical waveguide that confines a light both in vertical directions, (height directions) and in lateral directions (right and left directions).

The three-dimensional optical waveguide is shaped by working the non-linear optical crystal, for example physically working the crystal by machining or laser working.

To the contrary, the conventional three-dimensional optical waveguide is ordinarily formed as follows.

(1) The surface region of the substrate made of a non-linear optical crystal is modified to partially change the composition thereof, so that a modified layer having a high refractive index, for example, a titanium-diffused layer or a proton-exchanged layer is provided.

(2) A film of a single crystal having a refractive index higher than that of a substrate made of a non-linear optical crystal is formed on a surface of the substrate, and the single crystal film is worked in a slender, planar shape.

However, for example, it is difficult to form periodically polarization-inverted structure in a film of the single crystal after the single crystal film is formed. On the other hand, as mentioned above, it is known that a proton-exchanged layer having a periodically polarization-inverted structure is formed in a surface region of a substrate of a lithium niobate single crystal, and such a layer is used as an optical waveguide. However, the resulting second harmonic generation device suffers from large optical damage.

In the above second harmonic generation device, a cause which provokes optical damage when a light having a short wavelength of 400 to 430 nm, for example, is propagated at a high output is considered to be that the density of the output of the light confined in the optical waveguide exceeds a threshold in optical damage resistance of the crystal.

However, the present inventors produced a device as in FIG. 1 in trial, and propagated light having a short wavelength at a high output density. Consequently, the inventors discovered that variations in the output of the second harmonic waves emitted from the optical waveguide was suppressed to control the optical damage inside the optical waveguide. That is, it was discovered that when the light having a wavelength of 400 to 430 nm, for example, was propagated at a high output, the output density of the light confined in the optical waveguide did not exceed optical damage resistance inherently possessed by the crystal, and that there was still an allowance. Simultaneously with this, it was also discovered that the optical damage seen when the optical waveguide was formed by the proton exchange method, was provoked by degradation of the crystal in the surface region in the proton-exchanging step and reduction in optical damage resistance accompanying it.

As a result, the present invention can provide the optical waveguide element in which variations in the output of the light are suppressed with extremely small optical damages.

Together with the above it is important to join or bond the bulky three-dimensional optical waveguide formed by working through machining or the like to the joining layer of an amorphous material. For example, if the three-dimensional optical waveguide is joined to the substrate without the joining layer, excessive stress acts upon the optical waveguide due to difference in thermal expansion between the substrate and the optical waveguide during temperature descending after joining or due to temperature change after the joining. Reasons are as follows. That is, there is a difference in thermal expansion between the substrate and the optical waveguide is surely present due to difference in composition. Further, since the crystalline orientation of the substrate differs from that of the optical waveguide and the substrate is far larger and more bulky than the optical waveguide, a large stress acts from the substrate to the optical waveguide to cause strain in the optical waveguide. Consequently, it is likely that the propagating mode of the light traveling the inside of the optical waveguide varies or the optical damage occurs.

Further, if a single crystal is used as a material of the joining layer, the crystalline orientation in the joining layer also differs from that in the optical waveguide, which is likely to cause strain inside the optical waveguide. Further, if a polycrystal is used as a material for the joining layer, any light coming out from the optical waveguide to the joining layer is scattered with crystal grain boundaries, etc. within the joining layer, which increase the propagation loss.

To the contrary, according to the present invention, the bulky three-dimensional optical waveguide is joined to the substrate, and therefore, excellent crystallinity possessed by the bulk is utilized. Further, the optical waveguide contacts directly to the optical waveguide, not to the substrate, and the volume of the joining layer is far smaller than that of the substrate, so that stress more easily escapes into the joining layer and thus large stress is more unlikely to act upon the optical waveguide from the joining layer. In addition, since the joining layer is made of the amorphous material, stress acting upon the joining layer is easily dispersed, thereby further decreasing the strain of the optical waveguide.

According to the description in "TECHNICAL REPORT OF IEICE US 95-24: EMD 95-20: CPM 95-32 (1995-07) pp 31 to 38, a substrate of lithium niobate is directly joined to a substrate lithium tantalate, and the lithium niobate substrate is thinned, thereby preparing an optical waveguide structure in trial. This structure is different from the present invention in that the substrates are joined directly to each other by utilizing hydroxyl groups absorbed onto the surfaces of the substrates.

JP-A 7-225,403 discloses an optical waveguide element comprising a core of a non-linear optical material and a clad substrate surround the core, which element differs from the structure according to the present invention in which the bulky three-dimensional optical waveguide is joined to the substrate via an amorphous material.

In the present invention, when the periodic polarization-inverted structure is formed at least in the optical waveguide, the optical waveguide element can function as a harmonic generation element. IN this case, since a light having a wavelength shorter (higher energy) than that of the fundamental wave propagates, the function and effect of the present invention are particularly large.

When the element according to the present invention is used particularly as a second harmonic generation device, the harmonic wave has a wavelength of preferably 330–550 nm, and particularly preferably 440–430 nm.

In a preferred embodiment of the present invention, an optical waveguide is a ridge type optical waveguide projection from the joining layer or the substrate.

Further, in another preferred embodiment, a pair of extended portions are provided at opposite sides of the optical waveguide in transverse directions thereof, respectively. These extended portions make the joined state of the optical waveguide on the substrate stable. Further, the provision of the extended portions at the opposite sides of the optical waveguide make the propagating state of the light symmetrical.

Although any particularly limitation is posed upon the non-linear optical crystal constituting the optical waveguide, a ferroelectric single crystal in which a periodically polarization-inverted structure is easily formed is preferred. Particularly, single crystals of lithium niobate (LiNbO$_3$), lithium tantalate (LiTaO$_3$), lithium niobate-lithium tantalate solid solution, and K$_3$Li$_2$Nb$_5$O$_{15}$ are preferred.

In order to further improve the optical damage resistance of the three-dimensional waveguide, one ore more metallic elements selected from the group consisting of magnesium (Mg), zinc (Zn), scandium (Sc) and indium (In) may be incorporated, and magnesium is preferred among them.

In order to form the periodically polarization-inverted structure in the optical waveguide, a single crystal of lithium niobate, a single crystal of a lithium niobate-lithium tantalate solid solution or these single crystal added with magnesium are particularly preferred from the standpoint of view that the polarity-inverted characteristics (condition) are clear.

When the joining layer is provided, the material for the substrate is not particularly limited, so long as it has a given structural strength. However, the nearer physical properties between the optical waveguide and the coefficient of thermal expansion, the more excellent is the result. Particularly, single crystals of lithium niobate (LiNbO$_3$), lithium tantalate (LiTaO$_3$), lithium niobate-lithium tantalate solid solution, and K$_3$Li$_2$Nb$_5$O$_{15}$ are preferred.

Another film may be formed on the surface of the substrate. This film may be formed by a liquid phase epitaxial method, a sputtering method, a vapor deposition method, a spin coat method, a chemical vapor deposition method or the like. Although a material for the film is not particularly limited, silicon oxide, niobium pentaoxide, tantalum pentaoxide, lithium niobate, lithium tantalate, and lithium niobate-lithium tantalate solid solution may be recited.

When at least a surface region of the substrate functions as an underclad, at least the refractive index of the surface region of the substrate preferably has a refractive index smaller than that of the material of the optical waveguide.

It is preferably that the refractive index of the material of the joining layer is smaller than that of the material of the optical waveguide. The difference in refractive index is preferably not less than 5%, and more particularly not less than 10%. The material of the joining layer is preferably an organic resin or glass (particularly preferably glass having a low melting point). As the organic resin, an acrylic resin, an epoxy resin, a silicone resin and the like may be recited. As the glass, low melting point glass composed mainly of silicon oxide is preferred.

In order that the joining layer may function as an underclad, the thickness of the underclad is preferably not less than 0.1 $\mu$m, more preferably not less than 0.2 $\mu$m. From the standpoint of the positional stability of the three-dimensional optical waveguide, the thickness of the joining layer is not more than 3 $\mu$m.

Figure 1A:
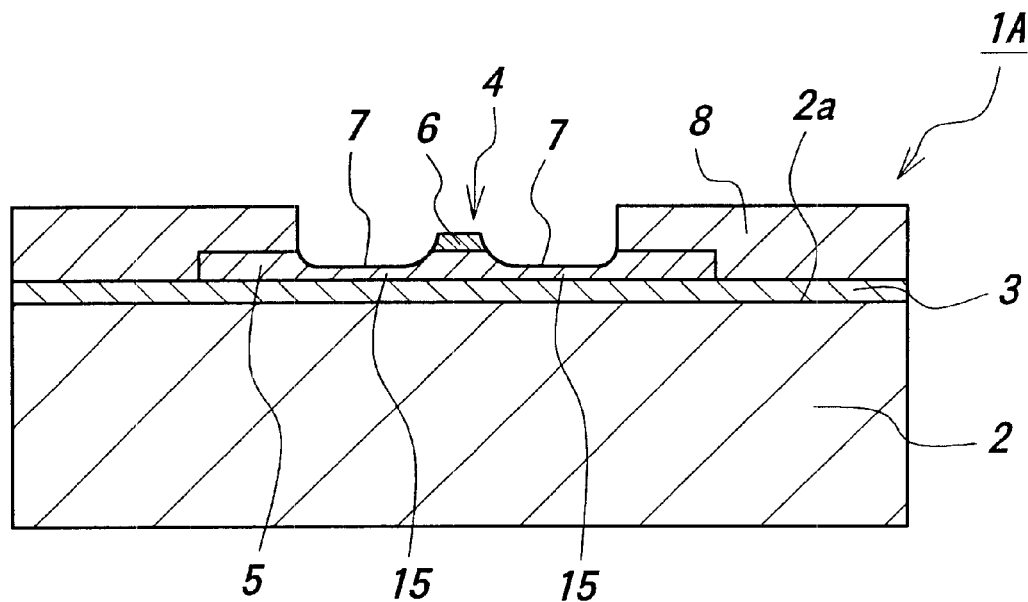
Figure 1B:
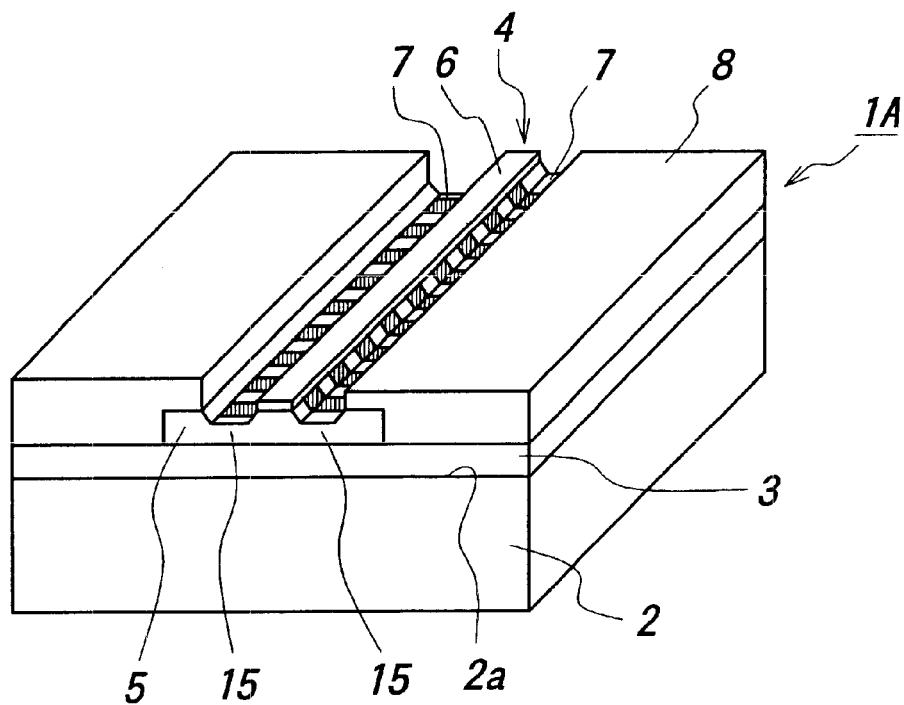
Figure 2A:
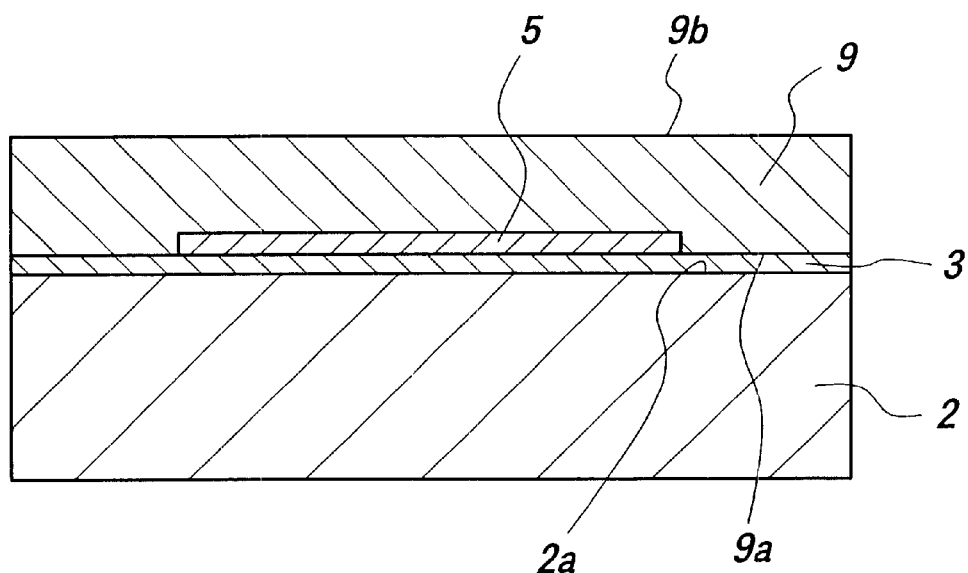
Figure 2B:
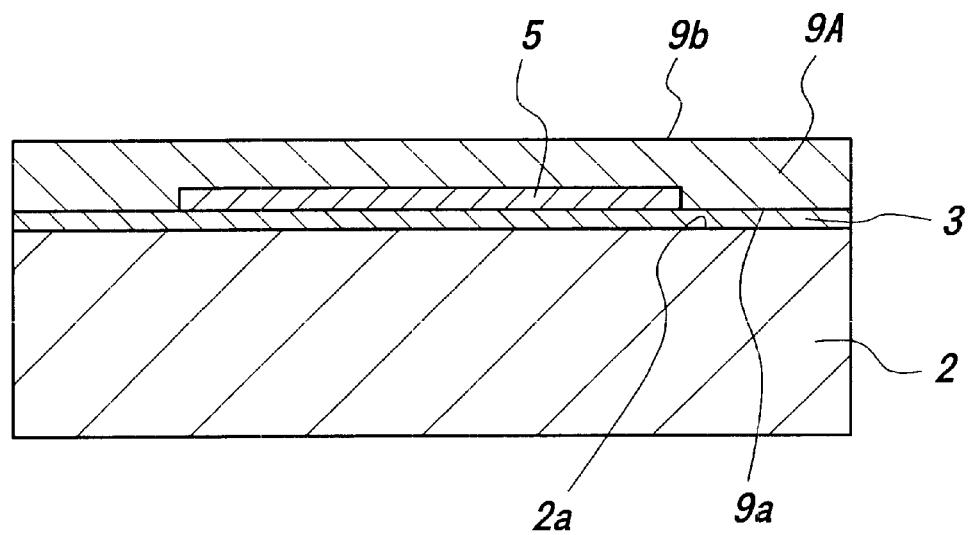

In order to product an optical waveguide element shown in FIGS. 1(a) and 1(b), the following method is employed, for example. That is, as shown in FIG. 2(a), a periodically polarization-inverted structure is formed at a surface of a material 9 for forming an optical waveguide. The surface (joining surface) 9a of the optical waveguide-forming material 9 on the side of the structure 5 is joined to a surface 2a of the substrate 2. Then, as sown in FIG. 2(b), a rear face (non-joined surface) 9b of the optical waveguide-forming material 9 is ground to form a thin material 9A. At this stage, it is difficult to thin the material 9A down to such a dimension as to confine the light in a thickness direction. Therefore, as shown in FIGS. 1(a) and 1(b), grooves 7 are formed to shape an optical waveguide 4 of a ridge type structure. At this time, the thickness of the optical waveguide is adjusted. This working can be done by using a dicing device or a laser working device, for example, and a machining like dicing is preferred.

No limitation is posed upon the method for the formation of the periodically polarization-inverting structure. As a method for forming a substrate of an electro-optic single crystal, for example, a substrate of lithium niobate, a Ti in-diffusion, an Li$_2$O external diffusion method, an SiO$_2$ coating/heating method, a Ti heat oxidation method, a proton exchanging/heating method, an electron beam scanning/irradiation method, a voltage applying method, a corona charging method, etc. are preferred. Among them, when a X-cut or Y-cut substrate or an off-cut substrate is used, the voltage applying method is particularly preferred form the standpoint of forming the deep periodically polarization-inverted structure with a high precision. On the other hand, the corona charging method or the voltage applying method is particularly preferably, when the Z-cut substrate is used.

As a method for grinding the optical waveguide to a given height, it is preferable that a distance between a bottom of the optical waveguide and cutting outer peripheral blades which rotate vertically to the bottom of the optical waveguide is set at a given level, and cutting is effected to make the thickness of the optical waveguide to a necessary value. The reason is as follows.

When the height of a workpiece having an almost planar shape is to be adjusted by grinding, the surface of the workpiece is commonly grand with external blades rotating in parallel to this surface. However, since the thickness is likely to be non-uniform due to a slight inclination of the rotating face of the external blades, it was difficult to control the height of the optical waveguide having a slender shape with a width of few to several $\mu$m and a length of around 1 mm in the order of submicrons.

To the contrary, when cutting is effected while the distance between the bottom of the substrate and the cutting exterior blades rotating vertically to the bottom of the optical waveguide is set a given height, adjustment is possible in a height direction by adjusting the height of the exterior blades, and the precision at that time corresponds to a working precision (submicron order) of the general working machine.

Figure 4:
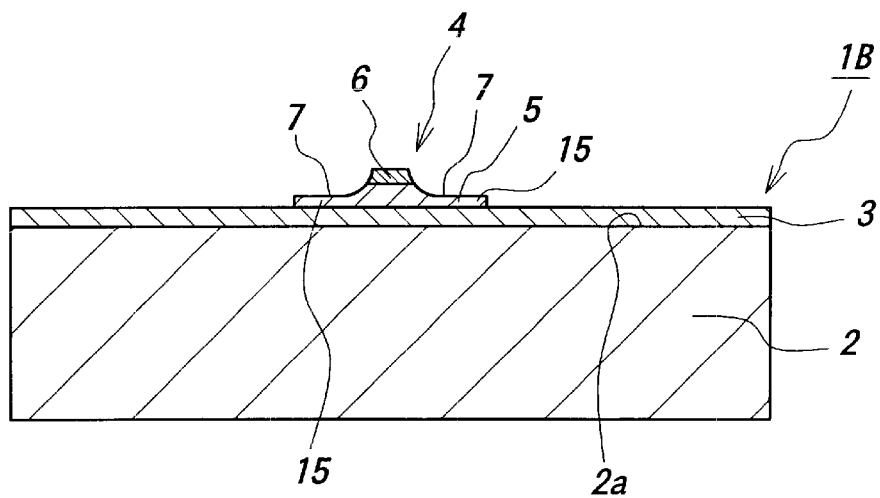
FIG. 4 is a sectional view of schematically illustrating another embodiment 1B of the optical waveguide element according to the present invention in which thick portions 8 in FIGS. 1(a) and 1(b) are removed.

As shown in an optical waveguide 1B in FIG. 4, thick portions 8 may be omitted at extended portions. The thick portions 8 can be removed with the dicing device as mentioned above.

Figure 5:
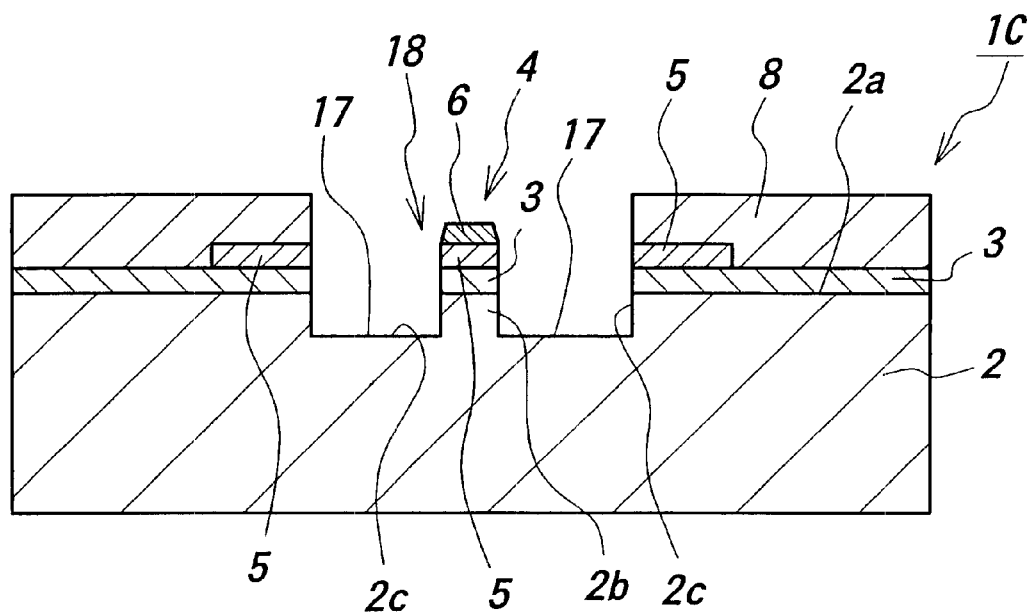
FIG. 5 is a sectional view of schematically illustrating a further embodiment of the optical waveguide element 1C according to the present invention in which grooves 2c are formed in a substrate 2.

When a ridge structure is formed, grooves may be formed in a substrate. For example, in an optical waveguide element 1C in FIG. 5, which is similar to that 1A in FIGS. 1(a) and 1(b), grooves 2c are formed in a substrate 2, and grooves 17 at opposite sides of a ridge structure 8 enter the substrate 2. As a result, the ridge structure 18 comprises a projection 2b of the substrate, a joining layer 3 on the projection 2b and an optical waveguide 4 on the joining layer 3.

Figure 6:
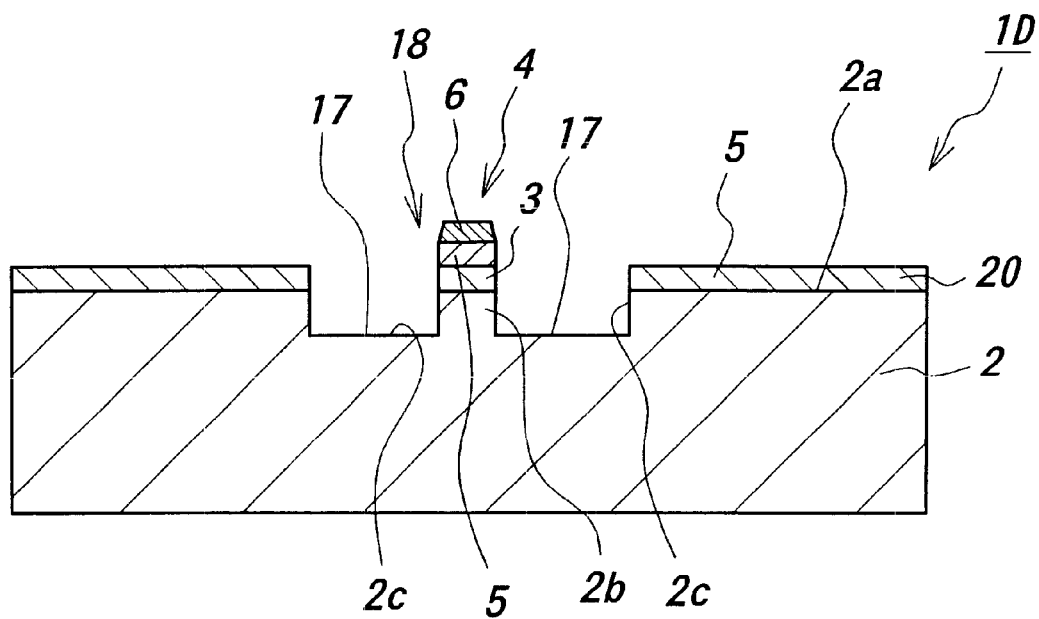
FIG. 6 is a sectional view of schematically illustrating a still further embodiment of the optical waveguide element 1D according to the present invention in which grooves 2c are formed in a substrate 2.

In an optical waveguide element 1D in FIG. 6, which is similar to the optical waveguide element 1C, recesses 2c are formed to shape a projection 2b of the substrate 2. A reference number 20 is the same material as the joining layer 3, and the thick portions 8 are removed.

FIGS. 1, 4, 5 and 6, a lower portion of the optical waveguide is a periodically polarization-inverted portion 5, and an upper portion thereof is a non-inverted portion 6. However, the entire optical waveguide may be a polarization-inverted portion. Further, it may be that the upper portion of the optical waveguide is a periodically polarization-inverted portion 5, and its lower portion is a non-inverted portion 6.

In one embodiment, a dielectric-loaded type three-dimensional optical waveguide can be used. For example, in an optical waveguide element 1E in FIG. 7, a three-dimensional optical waveguide 10, a pair of extended portions 15 and a pair of thick portions 8 are joined to a surface 2a of a substrate via a joining layer 3. The three-dimensional optical waveguide 10 and the extended portions 15 constitute a thin portion, which is set at such a thickness as to confine the light in a thickness direction. A dielectric layer 12 is formed at a surface of the thin portion, and thus the three-dimensional optical waveguide 10 is formed on the dielectric layer 12. In this embodiment, the dielectric layer 12 projects into the joining layer 3.

The optical waveguide element in FIG. 7 is produced by the following method, for example. That is, as shown in FIG. 8(a), a periodically polarity-inverted structure 5 is formed at a surface of an optical waveguide-forming material 9, and a dielectric layer 12 is formed thereon. The dielectric layer 12 is not limited to any material, so long as the material has a refractive index greater than that of the material 9. However, niobium oxide is preferred, for example. A joining surface 9c of the optical waveguide-forming material 9 is joined to a surface 2a of a substrate 2. Next, as shown in FIG. 8(b), a rear face (non-joining surface) of the material 9 is ground to form a thin portion 9A. Then, as shown in FIG. 7, a recess 11 is formed to shape thick portions 8 and thin portion 10, 15. Such are worked by using the method described before.

As in an optical waveguide element 1F in FIG. 9, the thick portions 8 on the extended portions may be omitted.

Alternatively, a dielectric may be loaded on an upper side (opposite side to the substrate) of the optical waveguide. In an optical waveguide element 1G of FIG. 10, a dielectric 12 may be loaded onto an optical waveguide 10. In an optical waveguide element 1H of FIG. 11, a dielectric 12 is loaded onto an optical waveguide, and such extended portions 8 as in FIG. 10 are omitted.

According to the present invention, the depth of the grooves 7 in FIG. 1 is increased so that they may extend into the joining layer 3, which can omit the extended portions 15. In this case, the grooves 7 reach the joining layer 3 as shown in an optical waveguide element 1J of FIG. 12, for example, so that a ridge type optical waveguide 4 directly projects from the joining layer 3.

Further, an overcoat layer may be provided to cover at least an optical waveguide. FIG. 13 shows an element 1K as an embodiment of this type. A surface of this element is covered with such an overcoat layer 21 on a side of an optical waveguide 4.

In this structure, the surface of the optical waveguide directly contacts not open air, but the overcoat layer. Therefore, if the surface of the optical waveguide is coursed or finely cut, for example, the scattering of light can be more suppressed as compared with a case where the optical waveguide is exposed to open air.

Although the overcoat layer is not limited to any material, silicon oxide ($SiO_2$), niobium pentaoxide, tantalum pentaoxide or various resin materials are preferred, for example.

In a preferred embodiment of the present invention, an optical waveguide element is provided with a pair of extended portions and a ridge type optical waveguide projecting from the extended portions to a joining layer. FIG. 14 shows an element 1L according to this embodiment.

For the substrate are provided a pair of thick portions 8, a pair of extended portions 26, and an optical waveguide 24 projecting from the extended portions to a joining layer 3. A pair of grooves 23 are formed between the thick portions 8 and the optical waveguide 24, and an amorphous material 22 is filled in the grooves 23. The filler 22 of the amorphous material is preferably continued to the joining layer 3.

In this embodiment, the optical waveguide 24 comprises a periocally polarization-inverted portion 5 and a polarization non-inverted, projecting portion 25, and the polarization-inverted portion 5 is provided near an end portion of the optical waveguide near the substrate 2.

According to this structure, the surface of the optical waveguide contacts the amorphous material. Therefore, if the surface of the optical waveguide is coarsed or finely cut, for example, the scattering of light can be more suppressed as compared with a case where the optical waveguide is exposed to open air. Thus, variation in optical insertion loss decreases.

Although a method for producing such an element is not particularly limited, the method mentioned before is preferably used. That is, as shown in FIG. 15(a), a periodically polarization-inverted structure 5 is formed at a surface of an optical waveguide-forming material 9. Then, as shown in FIG. 15(b), grooves 23 each having a given shape are formed by machining or laser working mentioned before, and a ridge-structured optical waveguide 24 is formed between a pair of the grooves 23.

Then, as shown in FIG. 15(c), a surface 9a on a side of the structure 5 of an optical waveguide-forming material 9 is joined to a surface 2a of a substrate. At that time, an amorphous material 22 is filled in the grooves 23. Then, a rear face (non-joined face) of the optical waveguide-forming material 9 is ground to thin the material 9 and form the thick portions 8 and the extended portions 26 in FIG. 14.

In a preferred embodiment where a pair of extended portions are extended in transversely opposite directions of an optical waveguide, respectively, single mode propagation occurs both for a wavelength of a fundamental wave and that of a wavelength-converted wave of a harmonic generation element. Particularly preferably, the width of the optical waveguide is 1 to 10 μm, and the height of the optical waveguide as measured from the extended portions is 0.2 to 5 μm, and the thickness of the extended portion is 0.5 to 5 μm.

This embodiment will be explained.

In order to find out an optical waveguide structure which affords a single mode condition for both an excited light and a wavelength-converted light, detailed investigations have been effected by using an optical waveguide structure-analysis technique based on a finite element method, and characteristics were experimentally confirmed. As a result, it was discovered that the optical waveguide element in FIG. 1, for example, satisfies this condition, and that such an optical waveguide element can be easily produced because of an extremely large dimensional tolerance of the optical waveguide which realizes high performance.

The element in FIG. 1 comprises the three-dimensional optical waveguide 4 and a pair of the extended portions 15 extending at the opposite sides thereof, respectively. Such a structure is seen in the elements in FIGS. 3, 4, 13 and 14.

Concrete examination was effected, provided that the wavelength $\lambda 1=810$nm of an excited light, and $\lambda 2=405$ nm of a converted light. This examination was effected on a model shown in FIG. 16. In this model, 2 is a substrate, 3 a joining layer, 4 a ridge portion, 15 an extended portion, and 30 an under portion of the optical waveguide as divided for calculating the structure of FIG. 3.

FIGS. 17 and 18 show examples of calculated results of the coupling loss in direct optical coupling between an excited laser and the fundamental mode of the optical waveguide (wavelength: $\lambda 1$). In the calculating examples in FIGS. 17 and 18, the ridge portion 14 and the extended portions 15 were made of the same non-linear optical material, and this non-linear optical material gave a refractive index of 2.14 for the wavelength: λ1 and 2.29 for the wavelength: λ2. The joining layer 3 gave a refractive index of 1.51 for both the wavelengths indexes λ1 and λ2. As a spot for the excited laser to be coupled with this wavelength, a Gaussian beam having an x-direction radius of 1.5 μm and a y-direction diameter of 1.0 μm was assumed.

The width w of the ridge portion 4 was taken along an abscissa. A coupling loss η between the mode field of the optical waveguide and a Gaussian beam having an x-direction diameter of 3 μm and a y-direction diameter of 2 μm was taken along an ordinate. The height of the ridge portion 4 was fixed at t1=1.0 μm for FIG. 17 and t1=2.0 μm for FIG. 18. In each graph, the thickness t2 of the extended portion was varied in a range of 1.0 to 4.0 mm. Those denoted by solid lines in FIGS. 17 and 18 are single mode-propagating zones.

In each graph, there is a certain threshold value ws for the width of the ridge portion 4. For example, it is seen that when t1=1.0 μm and t2=not less than 2.0 μm, the single mode propagation occurs if w is less than the threshold value. In FIG. 17, ws varies in a range of 4 to 10 μm. However, if w is too narrow beyond necessity, the propagation approaches a slab mode, and gives a cutoff state (η increases). If t2 becomes less than around 1.0 μm, the light-confined state is extremely strong. Thus, in order to satisfy the single mode condition, w=not more than 1.0, and the coupling loss increases.

In the calculated example of FIG. 17, the optimum structure in which the coupling loss is minimum is realized in a range of the single mode of the optical waveguide near the width of the ridge portion 4, w=2.5 μm, the height of the ridge portion 4, t1=1.0 μm and the thickness of the extended portion, t2=1.5 μm.

In the calculated example of FIG. 18, the optical waveguide structure is also the optimum structure near w=2.5 μm, t1=2.0 μm and t2=1.5 μm.

In the above calculated examples, mentioning was effected with respect to t1=1.0 or 2.0 μm only, but it is clear that similar single mode propagation regions may be obtained with respect to other t1 values. It is confirmed through calculations and experiments that since the confining effect of the optical waveguide is increased by taking a larger t1, the threshold value ws decreases.

Although mentioning was effected with respect to t2=1.0, 1.5, 2.0, 2.5, 3.0, 3.5 or 4.0 μm, similar single mode propagation regions exist with respect to other t2 values. Since the confining effect of the optical waveguide is decreased by taking a larger t2, the confined effect of the optical waveguide becomes weak, and therefore the threshold value ws increases. On the other hand, since the confining effect of the optical waveguide is increased by taking a smaller t2, the threshold value ws decreases.

On the other hand, if either one of or both of ① a specific difference in refractive index "(n1−n2)/n2" in which n1 is a refractive index of the ridge portion 4 and the extended portion 15, and n2 is a refractive index of the underlining layer 30, and the extended portion 15, respectively, and ② a specific difference in refractive index "(n1−n2)/n2" in which n1 is a refractive index of the ridge portion 4 and the extended portion 15, and n2 is a refractive index of air (the refractive index of the overcoat layer instead of air, if the optical waveguide is overcoated), increases, the confined state of the optical waveguide becomes stronger and ws decreases, irrespective of the magnitudes of the refractive indexes n1 and n2. On the other hand, if one of or both of the above specific difference in refractive index decreases, it is clear that the confined state of the optical waveguide becomes weaker and ws increases, irrespective of which is larger, the refractive index n1 or n2.

In the above calculation, results were shown with respect to a case where the spot radius of the excited laser is 1.5 μm for an x-direction and 1.0 μm for an y-direction. The spot radius of the excited laser is determined in value, depending upon a combination of appropriate material, composition, structure and dimensions selected for use and operation wavelength. As a case may be, the laser beam may be coupled with the optical waveguide through a lens. In consideration of the above, the effective spot diameter values in size in a range from about 0.5 μm to about 5 μm.

For example, if a laser having a small effective spot diameter is used, w and t2 decreases under the condition where the coupling loss η between the excited laser and the present optical waveguide becomes infinitesimal, or when the spot diameter of the excited laser increased, w and t2 increase.

In the above examination, one example was given. Considering that the refractive index largely varies at a operational environmental temperature, the refractive index of the non-linear optical crystal or the non-linear polymer material is set in a range of around 1.3 to 2.5, and that of the bonding layer is in a range of 1.3 to 2.0. Therefore, the structure which satisfies the single mode condition in the present invention for the effective spot diameter of the laser used and also decreases the coupling loss with the laser is that the ridge type optical waveguide has the width of 1 to 10 μm and the height of 0.2 to 5 μm of the ridge portion 4, the thickness of the extended portion 15 and the underlining layer 30 is 0.5 to 5 μm, provided that the single mode is obtained.

And also, it is obvious that examination results are similar between a model having a substrate layer functioned as a clad and a model having no substrate layer.

(Refractive Index of Joining Layer)

In case of forming an optical wavelength converting element of an optical waveguide type, overlapping of fundamental wave mode and harmonic wave mode largely affects a conversion efficiency. The form of a guide mode is influenced by a refractive index of a joining layer. In FIG. 19 is shown a relation between a difference of refractive index between optical waveguide and joining layer and an electric field distribution, wherein a wavelength is 850 nm, and the optical wave guide is LiNbO$_3$ (refractive index: 2.166) and a substrate is LiTaO$_3$ (refractive index: 2.158). As the difference of refractive index increases, a symmetry of mode profile increases and a trapping is improved. As seen from FIG. 19, when the difference Δn of refractive index between the optical waveguide and the joining layer is not less than 5%, the symmetry of the mode increases and the efficiency is favorably made higher. Further, when Δn is not less than 10%, the trapping is strengthened and it is possible to improve the conversion efficiency.

(Formation of Single Mode Condition)

In order to transform the wavelength with a higher efficiency in the optical wavelength converting element of the optical waveguide type, it is inevitable to form condition of single mode propagation in the optical waveguide. Especially, it is desirable that the optical waveguide satisfies single mode condition with respect to the fundamental wave (a case of fundamental wave>wavelength of transformed light). Because, when the fundamental wave is input to the optical waveguide, there is a possibility that the propagating fundamental wave is diffused into plural guide modes in a multi-mode optical waveguide. In the optical wavelength converting element, the conversion efficient is dependent upon the power density of the fundamental wave, so that when the propagation mode of the fundamental wave is diffused in the multi-mode optical waveguide, the conversion efficiency extremely lowers. And also, there is caused a problem that output becomes unstable due to the diffusion of the propagating mode.

The single mode condition in the optical waveguide will be described below. In FIG. 20 is shown a relation between a difference Δn of refractive index to the joining layer when the waveguide is MgO-doped LiNbO$_3$ and a maximum thickness satisfying the single mode condition. The single mode depth is about 1 μm at the difference of refractive index of Δn=5%. As the difference of refractive index becomes larger, the single mode condition becomes severer. This shows that the thickness of the waveguide should be controlled to not more than 1 μm for realizing the difference of refractive index to the joining layer (not less than 5%) in order to obtain an optical waveguide having a strong trapping. However, as the thickness of the waveguide becomes thin, an aspect ratio of the guide mode increases and an aspect ratio of a mode profile in an output light is proportional thereto, so that when light is collected by a lens system, it is required to conduct beam shaping of the output light and the like. Even in case of coupling the light in the waveguide, the mode profile is largely different from a beam profile of usual semiconductor laser or solid laser, which results in the lowering of coupling efficiency. Further, a change of effective refractive index to thickness variation of the waveguide becomes large, so that the ununiformity of the waveguide increases. In order to improve this, it is required to increase the single mode depth of the waveguide. Considering the high efficiency coupling with the semiconductor laser, the single mode depth is required to be not less than 1 μm, so that the joining layer is required to be a material that the difference of refractive index between the joining layer and the optical waveguide is not more than 5%. Such a condition is difficult to realize a structure of the optical waveguide having the excellent symmetry and strong trapping.

For this end, a novel waveguide structure is proposed as a method of increasing the single mode depth in the invention. When a three-layer structure of waveguide, joining layer (refractive index of joining layer<refractive index of substrate) and substrate as shown in FIG. 21 is taken as a distribution of refractive index in a depth direction of the waveguide, it has been found that the single mode condition of the optical waveguide is not dependent upon the difference of refractive index between the waveguide and the joining layer but largely depends upon the difference of refractive index between the waveguide and the substrate at a state that an electric field distribution of a light propagating in the waveguide is existent at the side of the substrate. That is, the single mode condition of the waveguide can largely be mitigated by using a substrate having a refractive index near to that of the optical waveguide.

Concretely, the relation between the difference of refractive index and the single mode depth shown in FIG. 20 is substantially established when the difference of refractive index is replaced with the difference of refractive index between the waveguide and the substrate. That is, the depth of the waveguide as a single mode may be rendered into not less than 1 μm by setting the difference of refractive index between the substrate and the waveguide to not more than 5%. On the other hand, the electric field distribution of guided light existing in the optical waveguide can be controlled by the refractive index of the joining layer. As mentioned above, the refractive index of the joining layer is made smaller by not less than 5% than the refractive index of the waveguide, whereby the improvement of the symmetry electric field distribution of the guide mode and the strengthening of the trapping property can be realized. By arranging the joining layer can be independently designed the single mode condition of the waveguide and the electric field distribution of the guide mode. (However, such a condition is restricted when the electric field distribution of the guide mode is existent at the side of the substrate. Because, as the joining layer is too thick, the guide mode is not existent at the side of the substrate and hence the single mode condition is formed by the difference of refractive index between the waveguide and the joining layer.)

As the condition of the waveguide through the joining layer, there are required the following two points. That is, there are a point that the refractive index of the joining layer is lower than the refractive index of the substrate, and a point that the electric field distribution of the guide mode propagating in the optical waveguide is existent at the side of the substrate. Concretely, it is required that the electric field in the substrate is existent at not less than $\frac{1}{1000}$ of a maximum value of electric field in the waveguide. If the electric field in the substrate is smaller than the above value, the influence of the substrate upon the guide mode does not appear.

In FIGS. 22 and 23 are shown electric field distributions in case of using the joining layer and in case of using no joining layer, respectively, from which it is apparent that the presence of the joining layer largely increases the trapping in the waveguide and also increases the symmetry. As a result, it is understood that the increase of overlapping the fundamental wave and the harmonic wave in the waveguide is attained to increase the conversion efficiency in the waveguide having the joining layer two times or more.

(Thickness of Joining Layer)

The thickness of the joining layer will be described. As the thickness of the joining layer increases, the influence of the substrate upon the waveguide is lost as mentioned above, and it is difficult to form the single mode condition. On the other hand, as the thickness of the joining layer decreases, the influence of such a thickness of the joining layer upon the effective refractive index of the waveguide increases. This shows that the uniformity of the optical waveguide device is largely dependent upon the thickness of the joining layer. In the optical wavelength converting element of the optical waveguide type, an allowable degree of phase matching wavelength is as very severe as about 0.1 nm. For this end, when the phase matching partly differs due to the ununiformity of the waveguide, the conversion efficiency extremely lowers.

In FIG. 24 is shown a relation between the thickness of the joining layer and phase matching wavelength. When the thickness of the joining layer is not more than 0.1 μm, the dependency of the phase matching wavelength to the thickness of the joining layer is large. As the thickness becomes not less than 0.15 μm, the dependency gradually lowers and when the thickness is not more than 0.2 μm, the dependency becomes favorably small. Therefore, the joining layer is required to have a thickness that the dependency of the phase matching wavelength to the thickness of the joining layer becomes small and at the same time, it is necessary to thin the thickness to an extent that the electric field distribution of the guide mode is existent at the side of the substrate.

Although the above is described with respect to the electric field distribution of the waveguide in the depth direction, it is also applicable to any waveguides such as coated waveguide, ridge waveguide, machined waveguide and the like. In order to realize the trapping in a lateral direction of the waveguide, it is required to take the latter structure.

(Formation of Periodically Polarization-inverted Structure using an Off-cut Substrate)

In order to constitute the optical wavelength converting element having a high efficiency, a periodically polarization-inverted structure and an increase of overlapping with a light propagating through the optical waveguide are important. Assuming a case that a second harmonic wave having a wavelength of about 410 nm is generated from a fundamental wave having a wavelength of about 820 nm as a shape of an optical waveguide, a depth of the optical waveguide is about 2 μm, so that a depth of a periodically polarization inversion is required to be not less than 2 μm.

As a method of forming a deep polarization-inverted structure, there is a method of using an off-cut substrate having a crystal axis inclined with respect to the surface of the substrate. For example, in an X off-cut substrate, X-axis and Z-axis of the X plate (substrate having X-axis of crystal perpendicular to the surface of the substrate) are inclined by θ centering Y-axis. In a Y off-cut substrate, Y-axis and Z-axis of the Y plate (substrate having Y-axis of crystal perpendicular to the surface of the substrate) are inclined by θ centering X-axis. When the polarization inverting structure is formed by using such X cut-off substrate and Y cut-off substrate, it is made possible to from the deep polarization inverting structure, whereby a higher efficiency of the optical wavelength converting element is obtained. The polarization inverting depth increases as an off-cut angle increases. For instance, when a period of the periodically polarization inverting structure is 3 μm, the polarization-inverted depth is 1 μm at an off-cut angle of θ=1.5°, 1.7 μm at an off-cut angle of θ=3°, and about 2.5 μm at an off-cut angle of θ=5°, respectively. Therefore, it is desirable to use a substrate having an off-cut angle θ of not less than 3° for realizing a sufficient overlap of the optical waveguide and the periodically polarization inverting structure.

However, there are the following subjects when the polarization inverting structure is formed in the off-cut substrate:

(1) when a proton-exchanged optical waveguide is applied to the off-cut substrate, a propagation loss increases in proportion to the off-cut angle;
(2) when the proton-exchanged optical waveguide is formed in the Y off-cut substrate, the propagation loss is two times or more as compared with that in the X off-cut substrate.

In case of the proton-exchanged optical waveguide used in the conventional optical wavelength converting element of optical waveguide type, if it is intended to utilize the deep polarization inversion through the off-cut substrate, characteristics are degraded by the propagation loss of the optical waveguide, so that only the X off-cut substrate having θ of less than 3° is used. In case of using the Y off-cut substrate, the propagation loss of the optical waveguide 4–5 dB/cm or more and largely degrade the characteristics of the second harmonic wave generating element, so that such a substrate is difficult to be used in the proton-exchanged optical waveguide. The cause on the propagation loss of these optical waveguides is based on chemical damage produced in the proton-exchanging.

The optical wavelength converting element according to the invention is very effective to solve the above subject matters. In the optical wavelength converting element according to the invention, the formation of the optical waveguide is possible without using a proton-exchanging step, so that there is not caused the chemical damage. Therefore, it is possible to use the X off-cut substrate or Y off-cut substrate having an off-cut angle of not less than 3°, which has hardly been used in the conventional technique.

That is, in case of using the conventional X or Y off-cut substrate of θ=5°, a guide loss is not less than 2 dB/cm in the X off-cut substrate, and 4–5 dB/cm or more in the Y off-cut substrate. According to the invention, however, even when using the off-cut substrate of θ=5°, it is possible to form an optical waveguide having a low propagation loss of not more than 1 dB/cm. As a result, the conversion efficiency of the second harmonic wave generating element can be increased to not less than 2 times by utilizing the deep polarization inversion and the low loss waveguide structure.

And also, it has been confirmed that the structure of the optical wave-length converting element having a higher efficiency is obtained by using the Y off-cut substrate (substrate having an X-axis parallel to the surface of the substrate). That is, it has been found out that a thicker polarization inverting structure is formed in the Y off-cut substrate as compared with the conventionally used X off-cut substrate. In case of the Y off-cut substrate, a polarization inverting portion is obtained to have a depth deeper by 1.2 times than that of the X off-cut substrate. As a result, it is possible to enhance the conversion efficiency of the optical wavelength converting element to 1.2 times. As regards the polarization inverting period, the inverting structure formed in the Y off-cut substrate is made possible to more shorten the period, which is advantageous to realize an optical wavelength converting element laving a short wavelength. In the conventional optical wavelength converting element using the proton-exchanged optical waveguide, the use of the Y off-cut substrate is not examined because the guide loss is large. However, the use of the optical wavelength converting element according to the invention can form a low loss waveguide structure, and is possible to realize a high efficiency optical wavelength converting element.

(Modified Embodiment of Element)

In an embodiment of the invention, the three-dimensional optical waveguide comprises a projection portion projecting from the extended portion in a direction separating away from the substrate and a projection portion projecting from the extended portion in a direction approaching to the substrate. This embodiment corresponds to an element 1M shown in FIG. 27.

In the element 1M, a three-dimensional optical waveguide 34 and a pair of extended portions 15 are joined to a surface of a substrate 2 through a joining layer 3A. The three-dimensional optical waveguide comprises a projection portion 34b extending in a direction toward the substrate 2, a projection portion 34a extending in a direction separating away from the substrate, and a central portion 34c sandwiched between the projection portions 34a and 34b. The projection portions 34a, 34b are substantially symmetric with respect to the central portion 34c.

When using the three-dimensional optical waveguide of such a construction, a cross-sectional form of a light beam propagating through the optical waveguide approaches to a true circular form. Therefore, a coupling loss when the element is coupled to an external optical fiber is more reduced. Alternatively, an energy loss when a light propagating through the optical waveguide is collected and focused is reduced.

And also, it is possible to form a recess or a projection in the surface 2a of the substrate 2. In a particularly preferable embodiment, the thickness of the joining layer is made large between the three-dimensional optical waveguide and the surface of the substrate and made small between the extended portion and the surface of the substrate. Alternatively, the three-dimensional optical waveguide is disposed above the recess formed in the surface of the substrate. Thus, stress applied from the sides of the substrate and the joining layer to the three-dimensional optical waveguide is more reduced.

In FIG. 28 is shown an element 1N corresponding to the above preferable embodiment. A recess 31 is formed in the surface 2a of the substrate 2. A three-dimensional optical waveguide 4 and a pair of extended portions 15 are joined to the substrate surface 2a through a joining layer 3. That is, the three-dimensional optical waveguide 4 is located above the recess 31 and a material 32 for the joining layer is also filled in the recess 31. As a result, the thickness of the joining layer is relatively large between the three-dimensional optical waveguide and the substrate and relatively small between the extended portion and the substrate.

In such an embodiment, a ratio of the thickness between the three-dimensional optical waveguide and the substrate to the thickness between the extended portion and the substrate is favorable to be 10-1:1.

In another preferable embodiment, the recess is formed in the surface of the substrate and at least a part of the three-dimensional optical waveguide is located in the recess. FIG. 29 shows an element 1P corresponding to such an embodiment.

In the element 1P, a recess 31 is formed in the surface 2a of the substrate 2. And also, a three-dimensional optical waveguide 24A projects toward the substrate 2 and a top portion of the waveguide 24a locates in the recess 31. A material 32 for a joining layer is filled in the recess 31. Since the surface of the element is substantially flat, the aforementioned function and effects are obtained.

In an element 1Q shown in FIG. 30, a recess 31 is formed in a surface 2a of a substrate 2. And also, a three-dimensional optical waveguide 34 is provided with a pair of projection portions 34a and 34b, and a top of the projection portion 34b locates in the recess 31.

Moreover, it is not required that the joining layer is continuously formed over a full surface of the substrate between the three-dimensional optical waveguide and the substrate or between the extended portion and the substrate. For example, a space may be partly formed between the three-dimensional optical waveguide and the substrate, or a filling material other than a joining material may be filled in such a space. And also, a space may be partly formed between the extended portion and the substrate, or a filling material other than a joining material may be filled in such a space.

In addition, the joining layer may be made from plural kinds of materials. For instance, in an element 1R shown in FIG. 31, the extended portion 15 and the three-dimensional optical waveguide 4 are joined to the surface 2a of the substrate 2 through two kinds of joining layers 3B and 3C.

The invention will be described with respect to concrete examples.

EXAMPLE 1

There is manufactured an optical waveguide element 1A shown in FIG. 1. At first, a periodically polarization inverting structure 5 having a period of 3.2 μm and a polarization inverting depth of 2 μm is formed in an X-face of 3 degrees off-cut plate body 9 (87° Z-cut) made of lithium niobate doped with 5 mol % of MgO by a voltage applying process. Concretely, as shown in FIGS. 25 and 26, a polarization inverting structure 25 is formed in an off-cut (3 degrees) X plate body 21 (made of MgO-doped lithium niobate) at a pitch (period) of 3.2 μm by the voltage applying process. In this case, a comb-type electrode 23 and a strip electrode 22 are arranged on a front surface 21a of the plate body 21 so as to extend in an Z-direction and oppose to each other. On a rear surface 21b of the plate body 21 is disposed a uniform planar electrode 24. A voltage is applied at V1=5 kV/mm between the comb-type electrode 24 and the planar electrode 24 and at V2=5 kV/mm between the comb-type electrode 23 and the strip electrode 22, respectively, to form the periodically polarization inverting structure 25.

Since the plate body 21 is off-cut, the resulting inversion pattern extends along a polarization direction (Ps) of the plate body and hence extends from the surface 21a of the plate body toward the inside of the plate body in a direction inclining at an angle of 3 degrees with respect to the surface 21a.

Then, a surface 9a of the plate body 9 to be joined is adhered to a surface 2a of a substrate 2 (X off-cut lithium niobate substrate, thickness: 1 mm). As an adhesive is used a low melting point glass consisting essentially of silicon oxide. An adhesion temperature is about 500° C. and a thickness of an adhesion layer 3 (or joining layer) is about 0.5 μm.

Figure 3:
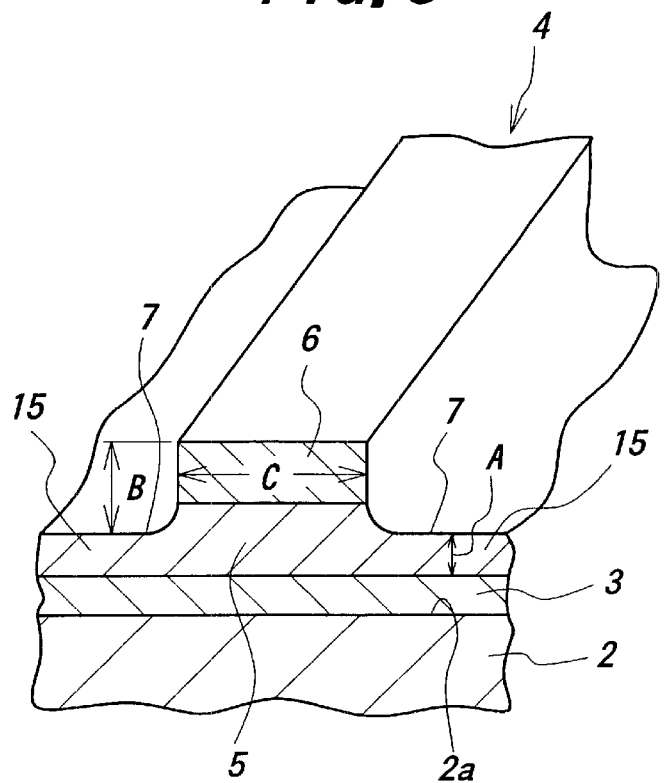
FIG. 3 is an enlarged view of a part of a ridge structure of the element in FIG. 1.

Then, the plate body 9 is polished by a mechanical polishing device such that a thickness of a polished plate body 9A is 50 μm. Next, a ridge structure shown in FIGS. 1 and 3 is formed in the polished plate body 9A by using a dicing apparatus. In this case, a thickness A of an extended portion 15 is 1 μm, and a height B (ridge height) of an optical waveguide 4 is 1.5 μm, and a width C of the ridge structure is 4 μm. As a dicing blade is used a resin-bonded diamond grindstone SD6000 (outer diameter: about 52 mm, thickness: 0.1 mm), wherein a revolution number of the blade is 30,000 rpm and a feeding rate of the blade is 1.0 mm/sec. After the formation of the ridge structure, the substrate provided with the plate body is cut in a cross-sectional direction thereof to form an element of 10 mm in length. Both cut end faces of the optical waveguide 4 are subjected to chemical-mechanical polishing.

A second harmonic wave is generated in the element by using a titanium-L-sapphire laser. In this case, a phase matching wavelength is 850 nm and a wavelength of the second harmonic wave is 425 nm. An SHG conversion efficiency is about 500%/W. When an output of a fundamental wave is 100 mW, an output of a second harmonic wave of 50 mW is obtained, and also the degradation of characteristics in the second harmonic wave due to light damage or the like is not observed. A relation between output of fundamental wave and output of second harmonic wave is shown in Table 1.

TABLE 1

| Output of fundamental wave mW | Output of second harmonic wave mW |
|---|---|
| 45 | 10 |
| 63 | 20 |
| 76 | 30 |
| 89 | 40 |
| 100 | 50 |

COMPARATIVE EXAMPLE 1

A periodically polarization inverting structure having a period of 3.2 μ and a polarization inverting depth of 2 μm is formed in an X-face of 3 degree off-cut plate body (87° Z-cut) made of lithium niobate doped with 5 mol % of MgO (thickness: 0.5 mm) in the same manner as in Example 1.

Then, a three-dimensional optical waveguide extending in a direction perpendicular to the polarization inverted pattern of the plate body is formed by a proton-exchanging process using pyrophosphoric acid. Concretely, the surface of the plate body is masked with a tantalum mask having an elongated straight opening of 4 µm therein. The plate body is immersed in pyrophosphoric acid heated to 200° C. for 10 minutes. After the mask is removed off, the plate body is subjected to an annealing treatment at 350° C. in air for 4 hours to form a three-dimensional optical waveguide. The plate body is cut to form an element of 10 mm in length. Both cut end faces of the optical waveguide are subjected to chemical-mechanical polishing.

A second harmonic wave is generated in the element by using a titanium-sapphire laser. In this case, a phase matching wavelength is 850 nm and a wavelength of a second harmonic wave is 425 nm. An SHG conversion efficiency is about 500%/W. When an output of a fundamental wave reaches up to about 15 mW, it is possible to stably generate the second harmonic wave without degrading the characteristics due to the light damage or the like. However, when the output of the second harmonic wave exceeds 15 mW, a change of output beam is caused by the light damage. When the output reaches to 20 mW, it is impossible to stably generate the second harmonic wave.

EXAMPLE 2

There is manufactured an optical waveguide element 1D shown in FIG. 6. In this case, a periodically polarization inverting structure 5 having a period of 3.2 µm and a polarization inverting depth of 2 µm is first formed in an X-face of 3 degree off-cut plate body 9 (87° Z-cut) made of lithium niobate doped with 5 mol % of MgO (thickness: 0.5 mm) in the same manner as in Example 1.

Then, a strip-like $Nb_2O_5$ film (dielectric layer) having a width of 4 µm and a thickness of 300 nm is formed on a joining face of the plate body 9 in a direction perpendicular to the direction of the polarization inverting pattern.

Next, a face 9a of the plated body 9 to be joined is adhered to a surface 2a of a substrate 2 (X off-cut lithium niobate substrate thickness: 1 mm). As an adhesive is used an epoxy resin curing at room temperature. An adhesion layer 3 has a thickness of about 0.5 µm.

Thereafter, the plate body 9 is polished by a mechanical polishing device such that a thickness of a polished plate body 9A is 20 µm. Then, a recess 11 is formed by using a dicing device so as to render a thickness of an extended portion 15 into 3 µm. As a dicing blade is used a resin-bonded diamond grindstone SD5000 (outer diameter: about 52 mm, thickness: 0.1 mm), wherein a revolution number of the blade is 10,000 rpm and a feeding rate of the blade is 0.5 mm/sec. The substrate provided with the plate body is cut in a cross-sectional direction thereof to form an element of 10 mm in length. Both cut end faces of the optical waveguide are subjected to chemical-mechanical polishing.

A second harmonic wave is generated in the element by using a titanium-sapphire laser. In this case, a phase matching wavelength is 850 nm and a wavelength of the second harmonic wave is 425 nm. An SHG conversion efficiency is about 500%/W. When an output of a fundamental wave is 100 mW, an output of a second harmonic wave of 50 mW is obtained, and also the degradation of characteristics in the second harmonic wave due to light damage or the like is not observed.

EXAMPLE 3

An element 1L shown in FIG. 14 is manufactured according to procedures of FIGS. 15a to 15c.

At first, a periodically polarization inverting structure 5 having a period of 2.8 µm and a polarization inverting depth of 2.5 µm is formed in an X-face of 3 degree off-cut plate body 9 (87° Z-cut) made of lithium niobate doped with 5 mol % of MgO (thickness: 0.5 mm) in the same manner as in Example 1.

Then, two grooves 23 each having a depth of 1.5 µm and a width of 5 µm are formed on the surface of the plate body 9 by a laser work using an excimer laser. Moreover, a distance between the grooves 23 is 5 µm.

Next, a face 9a of the plated body 9 to be joined is adhered to a surface 2a of a substrate 2 (X off-cut lithium niobate substrate thickness: 1 mm). As an adhesive is used an acrylic resin curing at room temperature. An adhesion layer 3 has a thickness of about 0.5 µm. And also, the adhesive is filled in the groove 23.

Thereafter, the plate body 9 is polished by a mechanical polishing device to obtain a structure shown in FIG. 14, wherein a thickness of a thick portion 8 is 3 µm. Such a structure is cut in a cross-sectional direction thereof to form an element of 10 mm in length. Both cut end faces of the optical waveguide are subjected to chemical-mechanical polishing.

A second harmonic wave is generated in the element by using a titanium-sapphire laser. In this case, a phase matching wavelength is 820 nm and a wavelength of the second harmonic wave is 410 nm. When an output of a fundamental wave is 100 mW, an output of a second harmonic wave of 60 mW is obtained, and also the degradation of characteristics in the second harmonic wave due to light damage or the like is not observed.

EXAMPLE 4

A periodically polarization inverting structure having a period of 2.8 µm is formed in a Z-cut plate body of lithium niobate doped with 5 mol % of MgO (thickness: 0.3 mm) by a corona charging process. That is, a periodically polarization inverting structure having a pitch of 2.7 µm is formed on +Z face of the plate body and then a polarization inverting structure is produced by scanning a corona wire on −Z face of the plate body. The polarization inverting structure is uniformly over a whole of the plate body in a thickness direction thereof.

Then, a strip-like plate having a width of 0.5 mm is cut out from the plate body in Y-direction, and a cut face (X) of the plate is subjected to chemical-mechanical polishing.

Next, the X face of the strip-like plate is adhered to a substrate (single silicon crystal thickness: 0.35 mm). As an adhesive is used an acrylic resin curing at room temperature. An adhesion layer 3 has a thickness of about 0.3 µm. Thereafter, the plate body 9 is polished by a mechanical polishing device such that a thickness of a polished plate body 9A is 3.5 µm. Then, two grooves 23 each having a depth of 2 µm and a width of 5 µm are formed on the surface of the polished plate body 9A by a laser work using an excimer laser. A distance between the two grooves 23 is 4 µm.

Then, the substrate provided with the plate body is cut in a cross-sectional direction thereof to form an element of 10 mm in length. Both cut end faces of the optical waveguide are subjected to chemical-mechanical polishing.

A second harmonic wave is generated in the element by using a titanium-sapphire laser. In this case, a phase matching wavelength is 820 nm and a wavelength of the second harmonic wave is 410 nm. When an output of a fundamental wave is 150 mW, an output of a second harmonic wave of 100 mW is obtained, and also the degradation of characteristics in the second harmonic wave due to light damage or the like is not observed.

As seen from the above, according to the invention, even when an output of a light emitted from the optical waveguide is increased in the device of optical waveguide type, stable oscillation can be realized with lessening a change of the output.

What is claimed is:

1. An optical waveguide element comprising a three-dimensional optical waveguide comprising a bulky non-linear ferroelectric optical crystal, a substrate, and a joining layer made of an amorphous material through which the substrate is joined to the optical waveguide, said joining layer extending across the entire surface of the substrate.

2. The optical waveguide element set forth in claim 1, wherein the joining layer functions as an underclad for the optical waveguide.

3. The optical waveguide element set forth in claim 1, wherein the substrate functions as an underclad for the optical waveguide.

4. The optical waveguide element set forth in claim 1, wherein a periodically polarization-inverted structure is formed at least in the optical waveguide, and the optical waveguide element functions as a harmonic wave generating element.

5. The optical waveguide element set forth in claim 1, wherein a cross-sectional shape of the optical waveguide is almost rectangular.

6. The optical waveguide element set forth in claim 1, wherein the optical waveguide is formed by mechanically working the non-linear optical crystal.

7. The optical waveguide element set forth in claim 1, wherein the optical waveguide is a ridge-type optical waveguide projecting from the joining layer.

8. The optical waveguide element set forth in claim 1, further comprising a pair of extended portions extending from the optical waveguide in opposite directions as viewed in a cross section of the optical waveguide.

9. The optical waveguide element set forth in claim 8, wherein the optical waveguide projects from the extended portions toward the joining layer.

10. The optical waveguide element set forth in claim 9, wherein a thick portion of the bulky non-linear crystal is provided on an outer side of each of the extended portions, a recess is provided between the thick portion and the optical waveguide, and said amorphous material is filled in the recess.

11. The optical waveguide element set forth in claim 1, wherein the optical waveguide is an optical waveguide of a dielectric-loaded type, and a layer of a dielectric is provided to form the optical waveguide.

12. The optical waveguide element set forth in claim 11, wherein the dielectric layer is opposed to the substrate through the joining layer.

13. The optical waveguide element set forth in claim 8, wherein a single mode propagation occurs both at a wavelength of a fundamental wave and that of a wavelength of a harmonic wave.

14. The optical waveguide element set forth in claim 13, wherein the optical waveguide has a width of 1 to 10 $\mu$m and a height of 0.2 to 5 $\mu$m as measured from the extended portion, and each of the extended portions has a thickness of 0.5 to 5 $\mu$m.

15. The optical waveguide element set forth in claim 1, wherein the joining layer has a refractive index smaller than that of the substrate.

16. The optical waveguide element set forth in claim 1, wherein the joining layer has a refractive index smaller than that of the optical waveguide by not less than 5%.

17. The optical waveguide element set forth in claim 1, wherein the substrate has a refractive index slightly smaller than that of the optical waveguide, and an electric field distribution of an optical wave mode propagating the optical waveguide exists in the substrate.

18. The optical waveguide element set forth in claim 17, wherein the refractive index of the substrate differs from that of the optical waveguide by not more than 5%.

19. The optical waveguide element set forth in claim 1, wherein the joining layer comprises a glass composed mainly of silicon dioxide.

20. The optical waveguide element set forth in claim 1, wherein the optical waveguide comprises a non-linear optical material composed mainly of $LiNb_xTa_{(1-x)}O_3$ ($0 \leq =1$).

21. The optical waveguide element set forth in claim 20, wherein the joining layer comprises a glass composed mainly of silicon dioxide, and the thickness of the joining layer is not less than 0.1 $\mu$m.

22. The optical waveguide element set forth in claim 1, which further comprises an overcoat layer covering at least the optical waveguide.

23. An optical waveguide element comprising a three-dimensional optical waveguide comprising a bulky non-linear ferroelectric optical crystal, and an underclad for the optical waveguide, wherein the three-dimensional waveguide is formed in such a thickness, by mechanically working the non-linear optical crystal, to permit light to be confined, and the underclad comprises an amorphous material.

24. The optical waveguide element set forth in claim 23, which further comprises a substrate joined to the optical waveguide and wherein the underclad is a joining layer extending across the entire surface of the substrate and joins the optical waveguide to the substrate.

25. The optical waveguide element set forth in claim 23, which further comprises a substrate joined to the optical waveguide and a joining layer that joins the optical waveguide to the substrate and wherein the substrate functions as an underclad.

26. The optical waveguide element set forth in claim 23, wherein a periodically polarization-inverted structure is formed at least in the optical waveguide, and the optical waveguide element functions as a harmonic wave-generating element.

27. The optical waveguide element set forth in claim 23, wherein the optical waveguide has an almost rectangular cross-sectional shape.

28. The optical waveguide element set forth in claim 23, wherein the optical waveguide is a ridge-type optical waveguide.

29. The optical waveguide element set forth in claim 23, wherein the optical waveguide is an optical waveguide of a dielectric-loaded type, and a layer of a dielectric is provided to form the optical waveguide.

30. The optical waveguide element set forth in claim 24, wherein the joining layer has a refractive index smaller than that of the substrate.

31. The optical waveguide element set forth in claim 24, wherein the joining layer has a refractive index smaller than that of the optical waveguide by not less than 5%.

32. The optical waveguide element set forth in claim 24, wherein the substrate has a refractive index slightly smaller than that of the optical waveguide, and an electric field distribution of an optical wave mode propagating the optical waveguide exists in the substrate.

33. The optical waveguide element set forth in claim 32, wherein the refractive index of the substrate differs from that of the optical waveguide by not more than 5%.

34. The optical waveguide element set forth in claim 23, wherein the amorphous material comprises a glass composed mainly of silicon dioxide.

35. The optical waveguide element set forth in claim 23, wherein the optical waveguide comprises a non-linear optical material composed mainly of $LiNb_xTa_{(1-x)}O_3$ ($0 \leq x \leq 1$).

36. The optical waveguide element set forth in claim 35, wherein the amorphous material comprises a glass composed mainly of silicon dioxide, and the thickness of the amorphous material is not less than 0.1 $\mu$m.

37. The optical waveguide element set forth in claim 1, wherein the three-dimensional optical waveguide is formed by working an optical waveguide-forming material comprising the bulky non-linear optical crystal, the optical waveguide-forming material is an off-cut substrate, and a C-axis of the non-linear optical crystal is inclined with respect to a surface of the off-cut substrate.

38. The optical waveguide element set forth in claim 37, wherein the C-axis of the non-linear optical crystal is inclined with respect to a surface of the offset substrate by not less than 3° to not more than 87°.

39. The optical waveguide element set forth in claim 37, wherein an X-axis of the non-linear optical crystal is parallel to the surface of the off-cut substrate.

40. A process for producing an optical waveguide element, comprising the steps of joining an optical waveguide-forming material comprising a bulky non-linear ferroelectric optical crystal to a separate substrate via a joining layer of an amorphous material, and forming a three-dimensional optical waveguide by working the optical waveguide-forming material, wherein the joining layer has a refractive index smaller than that of the non-linear optical crystal and extends across the entire surface of the substrate.

41. A process for producing an optical waveguide element, comprising the steps of joining an optical waveguide-forming material comprising a bulky non-linear ferroelectric optical crystal to a separate substrate via a joining layer of an amorphous material, and forming a three-dimensional optical waveguide by working the optical waveguide-forming material, wherein the substrate has a refractive index smaller than that of the non-linear optical crystal, and the joining layer extends across the entire surface of the substrate.

42. The optical waveguide element-producing process set forth in claim 40, wherein a periodically polarization-inverted structure is preliminarily formed at a joining surface side of the optical waveguide-forming material to the substrate, and the optical waveguide-forming material is joined to the substrate such that the joining surface side is joined to the substrate.

43. The optical waveguide element-producing process set forth in claim 40, wherein after the optical waveguide-forming material is joined to the substrate, the optical waveguide-forming material is mechanically worked.

44. An optical wavelength conversion element comprising a three-dimensional optical waveguide comprising a slab-shaped non-linear ferroelectric optical crystal, and clad layers of an amorphous material on upper and lower surfaces of the optical waveguide and extending over the upper and side surfaces of the optical waveguide.

45. The optical wavelength conversion element set forth in claim 44, wherein the optical waveguide satisfies a single mode condition for propagating light.

* * * * *

UNITED STATES PATENT AND TRADEMARK OFFICE
CERTIFICATE OF CORRECTION

PATENT NO. : 6,631,231 B2
DATED : October 7, 2003
INVENTOR(S) : Kiminori Mizuuchi et al.

It is certified that error appears in the above-identified patent and that said Letters Patent is hereby corrected as shown below:

Column 1,
Line 17, please delete "around"
Line 18, please add -- around -- after "range of"
Line 18, please change "nm" to -- nm, --
Line 19, please change "mW" to -- mW, --
Line 21, please add -- there is expected -- after "source,"
Line 23, please add -- wavelength -- after "infrared"
Line 23, please add -- a -- after "as"
Line 23, please change "waves" to -- wave --
Line 25, please delete "has been expected"
Line 32, please change "niobate" to -- niobate, --
Line 33, please add -- around 5 mol% -- after "which"
Line 33, please change "is used, it exhibits" to -- therein, --
Line 34, please delete "the"
Line 34, please add -- is exhibited -- after "damage"
Lines 34-35, please delete "At that time, the addition amount of MgO is around 5 mol %."
Line 47, please change "at" to -- from --
Line 50, please change "generated, the" to -- generated. The --
Line 51, please add -- of this structure -- after "output"
Line 54, please change "was" to -- is --

Column 2,
Line 34, please change "fourth" to -- fifth --
Line 60, please change "element" to -- optical waveguide --

Column 4,
Line 64, please change "is" to -- appears --
Line 66, please delete "never"

Column 6,
Line 44, please change "IN" to -- In --

Column 7,
Line 50, please change "product" to -- produce --

Column 8,
Line 26, please change "grand" to -- ground --

UNITED STATES PATENT AND TRADEMARK OFFICE
CERTIFICATE OF CORRECTION

PATENT NO.    : 6,631,231 B2
DATED         : October 7, 2003
INVENTOR(S)   : Kiminori Mizuuchi et al.

It is certified that error appears in the above-identified patent and that said Letters Patent is hereby corrected as shown below:

Column 9,
Line 49, please change "coursed" to -- coarsed --
Line 54, please change "oxide" to -- dioxide --

Column 11,
Lines 13 and 14, please change "for" to -- as shown in --

Column 15,
Line 41, please change "angle;" to -- angle; and --
Line 45, please add "the" after -- In --

Column 18,
Line 19, please change "oxide" to -- dioxide --

Signed and Sealed this

Tenth Day of February, 2004

JON W. DUDAS
*Acting Director of the United States Patent and Trademark Office*